(12) United States Patent
Gorshechnikov et al.

(10) Patent No.: US 10,974,389 B2
(45) Date of Patent: Apr. 13, 2021

(54) METHODS AND APPARATUS FOR EARLY SENSORY INTEGRATION AND ROBUST ACQUISITION OF REAL WORLD KNOWLEDGE

(71) Applicant: Neurala, Inc., Boston, MA (US)

(72) Inventors: Anatoly Gorshechnikov, Newton, MA (US); Massimiliano Versace, Milton, MA (US)

(73) Assignee: Neurala, Inc., Boston, MA (US)

( * ) Notice: Subject to any disclaimer, the term of this patent is extended or adjusted under 35 U.S.C. 154(b) by 76 days.

(21) Appl. No.: 16/376,109

(22) Filed: Apr. 5, 2019

(65) Prior Publication Data

US 2019/0240840 A1    Aug. 8, 2019

Related U.S. Application Data

(63) Continuation of application No. 14/947,516, filed as application No. PCT/US2014/039239 on May 22, 2014, now Pat. No. 10,300,603.
(Continued)

(51) Int. Cl.
*G06F 16/29* (2019.01)
*G06F 16/22* (2019.01)
(Continued)

(52) U.S. Cl.
CPC ........... *B25J 9/1694* (2013.01); *B25J 9/1664* (2013.01); *B25J 9/1697* (2013.01);
(Continued)

(58) Field of Classification Search
None
See application file for complete search history.

(56) References Cited

U.S. PATENT DOCUMENTS 5,063,603 A    11/1991   Burt
5,136,687 A    8/1992    Edelman et al.
(Continued)

FOREIGN PATENT DOCUMENTS

EP          1224622 B1      11/2004
WO      2014204615 A2      12/2014
(Continued)

OTHER PUBLICATIONS

Hodgkin, A. L., and Huxley, A. F. 1952. Quantitative description of membrane current and its application to conduction and excitation in nerve. J Physiol 117, pp. 500-544.
(Continued)

*Primary Examiner* — Roy Y Yi
(74) *Attorney, Agent, or Firm* — Smith Baluch LLP

(57) ABSTRACT

The systems and methods disclosed herein include a path integration system that calculates optic flow, infers angular velocity from the flow field, and incorporates this velocity estimate into heading calculations. The resulting system fuses heading estimates from accelerometers, 5 gyroscopes, engine torques, and optic flow to determine self-localization. The system also includes a motivational system that implements a reward drive, both positive and negative, into the system. In some implementations, the drives can include: a) a curiosity drive that encourages exploration of new areas, b) a resource drive that attracts the agent towards the recharging base when the battery is low, and c) a mineral reward drive that attracts the agent 10 towards previously explored scientific targets.

24 Claims, 21 Drawing Sheets

Related U.S. Application Data

(60) Provisional application No. 61/826,387, filed on May 22, 2013.

(51) Int. Cl.
*G06N 5/02* (2006.01)
*G06N 3/00* (2006.01)
*G06N 3/02* (2006.01)
*G06K 9/46* (2006.01)
*B25J 9/16* (2006.01)

(52) U.S. Cl.
CPC .......... *G06F 16/2228* (2019.01); *G06F 16/29* (2019.01); *G06K 9/4619* (2013.01); *G06K 9/4671* (2013.01); *G06N 3/008* (2013.01); *G06N 3/02* (2013.01); *G06N 5/02* (2013.01); *Y04S 10/50* (2013.01); *Y10S 901/01* (2013.01); *Y10S 901/09* (2013.01); *Y10S 901/46* (2013.01); *Y10S 901/47* (2013.01)

(56) References Cited

U.S. PATENT DOCUMENTS

| | | | |
|---|---|---|---|
| 5,172,253 | A | 12/1992 | Lynne |
| 5,388,206 | A | 2/1995 | Poulton et al. |
| 6,018,696 | A | 1/2000 | Matsuoka et al. |
| 6,336,051 | B1 | 1/2002 | Pangels et al. |
| 6,647,508 | B2 | 11/2003 | Zalewski et al. |
| 7,765,029 | B2 | 7/2010 | Fleischer et al. |
| 7,861,060 | B1 | 12/2010 | Nickolls et al. |
| 7,873,650 | B1 | 1/2011 | Chapman et al. |
| 8,392,346 | B2 | 3/2013 | Ueda et al. |
| 8,510,244 | B2 | 8/2013 | Carson et al. |
| 8,583,286 | B2 | 11/2013 | Fleischer et al. |
| 8,648,828 | B2 | 2/2014 | Katz |
| 8,648,867 | B2 | 2/2014 | Gorchetchnikov et al. |
| 9,031,692 | B2 | 5/2015 | Zhu |
| 9,177,246 | B2 | 11/2015 | Buibas et al. |
| 9,189,828 | B2 | 11/2015 | Gorchetchnikov et al. |
| 9,626,566 | B2 | 4/2017 | Versace et al. |
| 10,083,523 | B2 | 9/2018 | Versace et al. |
| 10,300,603 | B2 | 5/2019 | Gorshechnikov et al. |
| 2002/0046271 | A1 | 4/2002 | Huang |
| 2002/0050518 | A1 | 5/2002 | Roustaei |
| 2002/0064314 | A1 | 5/2002 | Comaniciu et al. |
| 2002/0168100 | A1 | 11/2002 | Woodall |
| 2003/0026588 | A1 | 2/2003 | Elder et al. |
| 2003/0078754 | A1 | 4/2003 | Hamza |
| 2004/0015334 | A1 | 1/2004 | Ditlow et al. |
| 2005/0166042 | A1 | 7/2005 | Evans |
| 2006/0184273 | A1 | 8/2006 | Sawada et al. |
| 2007/0052713 | A1 | 3/2007 | Chung et al. |
| 2007/0198222 | A1 | 8/2007 | Schuster et al. |
| 2007/0279429 | A1 | 12/2007 | Ganzer |
| 2008/0033897 | A1 | 2/2008 | Lloyd |
| 2008/0066065 | A1 | 3/2008 | Kim et al. |
| 2008/0117220 | A1 | 5/2008 | Gorchetchnikov et al. |
| 2008/0117720 | A1 | 5/2008 | Ogasawara |
| 2008/0258880 | A1 | 10/2008 | Smith et al. |
| 2009/0080695 | A1 | 3/2009 | Yang |
| 2009/0089030 | A1 | 4/2009 | Sturrock et al. |
| 2009/0116688 | A1 | 5/2009 | Monacos et al. |
| 2010/0048242 | A1 | 2/2010 | Rhoads et al. |
| 2010/0138153 | A1 | 6/2010 | Abe et al. |
| 2011/0004341 | A1 | 1/2011 | Sarvadevabhatla et al. |
| 2011/0173015 | A1 | 7/2011 | Chapman et al. |
| 2011/0279682 | A1 | 11/2011 | Li et al. |
| 2012/0072215 | A1 | 3/2012 | Yu et al. |
| 2012/0089295 | A1 | 4/2012 | Ahn et al. |
| 2012/0089552 | A1 | 4/2012 | Chang et al. |
| 2012/0197596 | A1 | 8/2012 | Comi |
| 2012/0316786 | A1 | 12/2012 | Liu et al. |
| 2013/0080641 | A1* | 3/2013 | Lui ..................... H04L 43/045 709/226 |
| 2013/0126703 | A1 | 5/2013 | Caulfield |
| 2013/0131985 | A1 | 5/2013 | Weiland et al. |
| 2014/0019392 | A1 | 1/2014 | Buibas et al. |
| 2014/0032461 | A1 | 1/2014 | Weng |
| 2014/0052679 | A1 | 2/2014 | Sinyayskiy et al. |
| 2014/0089232 | A1 | 3/2014 | Buibas et al. |
| 2014/0192073 | A1 | 7/2014 | Gorchetchnikov et al. |
| 2015/0127149 | A1 | 5/2015 | Sinyayskiy et al. |
| 2015/0134232 | A1 | 5/2015 | Robinson |
| 2015/0224648 | A1 | 8/2015 | Lee et al. |
| 2015/0269439 | A1 | 9/2015 | Versace et al. |
| 2016/0075017 | A1 | 3/2016 | Laurent et al. |
| 2016/0096270 | A1 | 4/2016 | Gabardos et al. |
| 2016/0198000 | A1 | 7/2016 | Gorshechnikov et al. |
| 2017/0024877 | A1 | 1/2017 | Versace et al. |
| 2017/0076194 | A1 | 3/2017 | Versace et al. |
| 2017/0193298 | A1 | 7/2017 | Versace et al. |

FOREIGN PATENT DOCUMENTS

| | | |
|---|---|---|
| WO | 2015143173 A2 | 9/2015 |
| WO | 2016014137 A2 | 1/2016 |

OTHER PUBLICATIONS

Hopfield, J. 1982. Neural networks and physical systems with emergent collective computational abilities. In Proc Natl Acad Sci USA, vol. 79, pp. 2554-2558.

Ilie, A. 2002. Optical character recognition on graphics hardware. Tech. Rep. integrative paper, UNCCH, Department of Computer Science, 9 pages.

International Preliminary Report on Patentability in related PCT Application No. PCT/US2014/039162 filed May 22, 2014, dated Nov. 24, 2015, 7 pages.

International Preliminary Report on Patentability in related PCT Application No. PCT/US2014/039239 filed May 22, 2014, dated Nov. 24, 2015, 8 pages.

International Preliminary Report on Patentability dated Nov. 8, 2016 from International Application No. PCT/US2015/029438, 7 pages.

International Search Report and Written Opinion dated Feb. 18, 2015 from International Application No. PCT/US2014/039162, 12 pages.

International Search Report and Written Opinion dated Feb. 23, 2016 from International Application No. PCT/US2015/029438, 11 pages.

International Search Report and Written Opinion dated Jul. 6, 2017 from International Application No. PCT/US2017/029866, 12 pages.

International Search Report and Written Opinion dated Nov. 26, 2014 from International Application No. PCT/US2014/039239, 14 pages.

International Search Report and Written Opinion dated Sep. 15, 2015 from International Application No. PCT/US2015/021492, 9 pages.

Itti, L., and Koch, C. (2001). Computational modelling of visual attention. Nature Reviews Neuroscience, 2 (3), 194-203.

Itti, L., Koch, C., and Niebur, E. (1998). A Model of Saliency-Based Visual Attention for Rapid Scene Analysis, 1-6.

Jarrett, K., Kavukcuoglu, K., Ranzato, M. A., & LeCun, Y. (Sep. 2009). What is the best multi-stage architecture for object recognition?. In Computer Vision, 2009 IEEE 12th International Conference on (pp. 2146-2153). IEEE.

Khaligh-Razavi, S.-M. et al., Deep Supervised, but Not Unsupervised, Models May Explain IT Cortical Representation, PLoS Computational Biology, vol. 10, Issue 11, 29 pages (Nov. 2014).

Kim, S., Novel approaches to clustering, biclustering and algorithms based on adaptive resonance theory and intelligent control, Doctoral Dissertations, Missouri University of Science and Technology, 125 pages (2016).

Kipfer, P., Segal, M., and Westermann, R. 2004. UberFlow: A GPU-Based Particle Engine. In Proceedings of the SIGGRAPH/ Eurographics Workshop on Graphics Hardware 2004, pp. 115-122.

(56) References Cited

OTHER PUBLICATIONS

Kolb, A., L. Latta, and C. Rezk-Salama. 2004. "Hardware-Based Simulation and Collision Detection for Large Particle Systems." In Proceedings of the SIGGRAPH/Eurographics Workshop on Graphics Hardware 2004, pp. 123-131.

Kompella, Varun Raj, Luciw, Matthew, and Schmidhuber, Jurgen. Incremental slow feature analysis: Adaptive low complexity slow feature updating from high-dimensional input streams. Neural Computation, 24(11):2994-3024, 2012.

Kowler, E. (2011). Eye movements: The past 25years. Vision Research, 51(13), 1457-1483. doi:10.1016/j. visres.2010.12.014.

Larochelle H., & Hinton G. (2012). Learning to combine foveal glimpses with a third-order Boltzmann machine. NIPS 2010,1243-1251.

LeCun, Y., Kavukcuoglu, K., & Farabet, C. (May 2010). Convolutional networks and applications in vision. In Circuits and Systems (ISCAS), Proceedings of 2010 IEEE International Symposium on (pp. 253-256). IEEE.

Lee, D. D. and Seung, H. S. (1999). Learning the parts of objects by non-negative matrix factorization. Nature, 401 (6755):788-791.

Lee, D. D., and Seung, H. S. (1997). "Unsupervised learning by convex and conic coding." Advances in Neural Information Processing Systems, 9.

Legenstein, R., Wilbert, N., and Wiskott, L. Reinforcement learning on slow features of high-dimensional input streams. PLoS Computational Biology, 6(8), 2010. ISSN 1553-734X. 13 pages.

Léveillé, J., Ames, H., Chandler, B., Gorchetchnikov, A., Mingolla, E., Patrick, S., and Versace, M. (2010) Learning in a distributed software architecture for large-scale neural modeling. BIONETICS10, Boston, MA, USA. 8 pages.

Livitz G., Versace M., Gorchetchnikov A., Vasilkoski Z., Ames H., Chandler B., Leveille J. and Mingolla E. (2011) Adaptive, brain-like systems give robots complex behaviors, The Neuromorphic Engineer, : 10.2417/1201101.003500 Feb. 2011. 3 pages.

Livitz, G., Versace, M., Gorchetchnikov, A., Vasilkoski, Z., Ames, H., Chandler, B., Léveillé, J., Mingolla, E., Snider, G., Amerson, R., Carter, D., Abdalla, H., and Qureshi, S. (2011) Visually-Guided Adaptive Robot (ViGuAR). Proceedings of the International Joint Conference on Neural Networks (IJCNN) 2011, San Jose, CA, USA. 9 pages.

Lowe, D.G.(2004). Distinctive Image Features from Scale-Invariant Keypoints. Journal International Journal of Computer Vision archive vol. 60, 2, 91-110.

Lu, Z.L., Liu, J., and Dosher, B.A. (2010) Modeling mechanisms of perceptual learning with augmented Hebbian re-weighting. Vision Research, 50(4). 375-390.

Mahadevan, S. Proto-value functions: Developmental reinforcement learning. In Proceedings of the 22nd international conference on Machine learning, pp. 553-560. ACM, 2005.

Meuth, J.R. and Wunsch, D.C. (2007) A Survey of Neural Computation on Graphics Processing Hardware. 22nd IEEE International Symposium on Intelligent Control, Part of IEEE Multi-conference on Systems and Control, Singapore, Oct. 1-3, 2007, 5 pages.

Mishkin M, Ungerleider LG. (1982). "Contribution of striate inputs to the visuospatial functions of parieto-preoccipital cortex in monkeys," Behav Brain Res, 6 (1): 57-77.

Mnih, Volodymyr, Kavukcuoglu, Koray, Silver, David, Rusu, Andrei A, Veness, Joel, Bellemare, Marc G, Graves, Alex, Riedmiller, Martin, Fidjeland, Andreas K, Ostrovski, Georg, et al. Human-level control through deep reinforcement learning. Nature, 518(7540):529-533, Feb. 25, 2015.

Moore, Andrew W and Atkeson, Christopher G. Prioritized sweeping: Reinforcement learning with less data and less time. Machine Learning, 13(1):103-130, 1993.

Najemnik, J., and Geisler, W. (2009). Simple summation rule for optimal fixation selection in visual search. Vision Research. 49, 1286-1294.

Non-Final Office Action dated Jan. 4, 2018 from U.S. Appl. No. 15/262,637, 23 pages.

Notice of Alllowance dated May 22, 2018 from U.S. Appl. No. 15/262,637, 6 pages.

Notice of Allowance dated Jul. 27, 2016 from U.S. Appl. No. 14/662,657.

Notice of Allowance dated Dec. 16, 2016 from U.S. Appl. No. 14/662,657.

Oh, K.-S., and Jung, K. 2004. GPU implementation of neural networks. Pattern Recognition 37, pp. 1311-1314.

Oja, E. (1982). Simplified neuron model as a principal component analyzer. Journal of Mathematical Biology 15(3), 267-273.

Partial Supplementary European Search Report dated Jul. 4, 2017 from European Application No. 14800348.6, 13 pages.

Raijmakers, M.E.J., and Molenaar, P. (1997). Exact ART: A complete implementation of an ART network Neural networks 10 (4), 649-669.

Ranzato, M. A., Huang, F. J., Boureau, Y. L., & Lecun, Y. (Jun. 2007). Unsupervised learning of invariant feature hierarchies with applications to object recognition. In Computer Vision and Pattern Recognition, 2007. CVPR'07. IEEE Conference on (pp. 1-8). IEEE.

Raudies, F., Eldridge, S., Joshi, A., and Versace, M. (Aug. 20, 2014). Learning to navigate in a virtual world using optic flow and stereo disparity signals. Artificial Life and Robotics, DOI 10.1007/s10015-014-0153-1. 15 pages.

Ren, Y. et al., Ensemble Classification and Regression—Recent Developments, Applications and Future Directions, in IEEE Computational Intelligence Magazine, 10.1109/MCI.2015.2471235, 14 pages (2016).

Riesenhuber, M., & Poggio, T. (1999). Hierarchical models of object recognition in cortex. Nature Neuroscience, 2 (11), 1019-1025.

Riesenhuber, M., & Poggio, T. (2000). Models of object recognition. Nature neuroscience, 3, 1199-1204.

Rublee, E., Rabaud, V., Konolige, K., & Bradski, G. (2011). ORB: An efficient alternative to SIFT or SURF. In IEEE. International Conference on Computer Vision (ICCV) 2011, 2564-2571.

Adelson, E. H., Anderson, C. H., Bergen, J. R., Burt, P. J., & Ogden, J. M. (1984). Pyramid methods in image processing. RCA engineer, 29(6), 33-41.

Aggarwal, Charu C, Hinneburg, Alexander, and Keim, Daniel A. On the surprising behavior of distance metrics in high dimensional space. Springer, 2001. 15 pages.

Al-Kaysi, A. M. et al., A Multichannel Deep Belief Network for the Classification of EEG Data, from Ontology-based Information Extraction for Residential Land Use Suitability: A Case Study of the City of Regina, Canada, DOI 10.1007/978-3-319-26561-2_5, 8 pages (Nov. 2015).

Ames, H, Versace, M., Gorchetchnikov, A., Chandler, B., Livitz, G., Léveillé, J., Mingolla, E., Carter, D., Abdalla, H., and Snider, G. (2012) Persuading computers to act more like brains. In Advances in Neuromorphic Memristor Science and Applications, Kozma, R.Pino,R., and Pazienza, G. (eds), Springer Verlag. 25 pages.

Ames, H. Mingolla, E., Sohail, A., Chandler, B., Gorchetchnikov, A., Léveillé, J., Livitz, G. and Versace, M. (2012) The Animat. IEEE Pulse, Feb. 2012, 3(1), 47-50.

Apolloni, B. et al., Training a network of mobile neurons, Proceedings of International Joint Conference on Neural Networks, San Jose, CA, doi: 10.1109/IJCNN.2011.6033427, pp. 1683-1691 (Jul. 31-Aug. 5, 2011).

Artificial Intelligence as a Service. Invited talk, Defrag, Broomfield, CO, Nov. 4-6, 2013. 22 pages.

Aryananda, L. 2006. Attending to learn and learning to attend for a social robot. Humanoids 06, pp. 618-623.

Baraldi, A. and Alpaydin, E. (1998). Simplified ART: A new class of ART algorithms. International Computer Science Institute, Berkeley, CA, TR-98-004, 1998. 42 pages.

Baraldi, A. and Alpaydin, E. (2002). Constructive feedforward ART clustering networks—Part I. IEEE Transactions on Neural Networks 13(3), 645-661.

Baraldi, A. and Parmiggiani, F. (1997). Fuzzy combination of Kohonen's and ART neural network models to detect statistical regularities in a random sequence of multi-valued input patterns. In International Conference on Neural Networks, IEEE. 6 pages.

(56) References Cited

OTHER PUBLICATIONS

Baraldi, Andrea and Alpaydin, Ethem. Constructive feedforward ART clustering networks—part II. IEEE Transactions on Neural Networks, 13(3):662-677, May 2002. ISSN 1045-9227. doi: 10.1109/tnn.2002.1000131. URL http://dx.doi.org/10.1109/tnn.2002.1000131.

Bengio, Y., Courville, A., & Vincent, P. Representation learning: A review and new perspectives, IEEE Transactions on Pattern Analysis and Machine Intelligence, vol. 35 Issue 8, Aug. 2013. pp. 1798-1828.

Berenson, D. et al., A robot path planning framework that learns from experience, 2012 International Conference on Robotics and Automation, 2012, 9 pages [retrieved from the internet] URL:http://users.wpi.edu/-dberenson/lightning.pdf.

Bernhard, F., and Keriven, R. 2005. Spiking Neurons on GPUs. Tech. Rep. 05-15, Ecole Nationale des Ponts et Chauss'es, 8 pages.

Besl, P. J., & Jain, R. C. (1985). Three-dimensional object recognition. ACM Computing Surveys (CSUR), 17(1), 75-145.

Boddapati, V., Classifying Environmental Sounds with Image Networks, Thesis, Faculty of Computing Blekinge Institute of Technology, 37 pages (Feb. 2017).

Bohn, C.-A. Kohonen. 1998. Feature Mapping Through Graphics Hardware. In Proceedings of 3rd Int. Conference on Computational Intelligence and Neurosciences, 4 pages.

Bradski, G., & Grossberg, S. (1995). Fast-learning VIEWNET architectures for recognizing three-dimensional objects from multiple two-dimensional views. Neural Networks, 8 (7-8), 1053-1080.

Brain-inspired computing. Invited keynote address, Bionetics 2010, Boston, MA, USA. 1 page.

Canny, J.A. (1986). Computational Approach to Edge Detection, IEEE Trans. Pattern Analysis and Machine Intelligence, 8(6):679-698.

Carpenter, G.A. and Grossberg, S. (1987). A massively parallel architecture for a self-organizing neural pattern recognition machine. Computer Vision, Graphics, and Image Processing 37,54-115.

Carpenter, G.A., and Grossberg, S. (1995). Adaptive resonance theory (ART). In M. Arbib (Ed.), The handbook of brain theory and neural networks. (pp. 79-82). Cambridge, M.A.: MIT press.

Carpenter, G.A., Grossberg, S. and Rosen, D.B. (1991). Fuzzy ART: Fast stable learning and categorization of analog patterns by an adaptive resonance system. Neural Networks 4,759-771.

Carpenter, Gail A and Grossberg, Stephen. The art of adaptive pattern recognition by a self-organizing neural network. Computer, 21(3):77-88, 1988.

Coifman, R.R. and Maggioni, M. Diffusion wavelets. Applied and Computational Harmonic Analysis, 21(1):53-94, 2006.

Coifman, R.R., Lafon, S., Lee, A.B., Maggioni, M., Nadler, B., Warner, F., and Zucker, S.W. Geometric diffusions as a tool for harmonic analysis and structure definition of data: Diffusion maps. Proceedings of the National Academy of Sciences of the United States of America, 102(21):7426, 2005. 21 pages.

Davis, C. E. 2005. Graphic Processing Unit Computation of Neural Networks. Master's thesis, University of New Mexico, Albuquerque, NM, 121 pages.

Dosher, B.A., and Lu, Z.L. (2010). Mechanisms of perceptual attention in precuing of location. Vision Res., 40(10-12). 1269-1292.

Ellias, S. A., and Grossberg, S. 1975. Pattern formation, contrast control and oscillations in the short term memory of shunting on-center off-surround networks. Biol Cybern 20, pp. 69-98.

Extended European Search Report and Written Opinion dated Jun. 1, 2017 from European Application No. 14813864.7, 10 pages.

Extended European Search Report and Written Opinion dated Oct. 12, 2017 from European Application No. 14800348.6, 12 pages.

Extended European Search Report and Written Opinion dated Oct. 23, 2017 from European Application No. 15765396.5, 8 pages.

Fazl, A., Grossberg, S., and Mingolla, E. (2009). View-invariant object category learning, recognition, and search: How spatial and object attention are coordinated using surface-based attentional shrouds. Cognitive Psychology 58, 1-48.

Földiák, P. (1990). Forming sparse representations by local anti-Hebbian learning, Biological Cybernetics, vol. 64, pp. 165-170.

Friston K., Adams R., Perrinet L., & Breakspear M. (2012). Perceptions as hypotheses: saccades as experiments. Frontiers in Psychology, 3 (151), 1-20.

Galbraith, B.V, Guenther, F.H., and Versace, M. (2015) A neural network-based exploratory learning and motor planning system for co-robots. Frontiers in Neuroscience, in press. 10 pages.

George, D. and Hawkins, J. (2009). Towards a mathematical theory of cortical micro-circuits. PLoS Computational Biology 5(10), 1-26.

Georgii, J., and Westermann, R. 2005. Mass-spring systems on the GPU. Simulation Modelling Practice and Theory 13, pp. 693-702.

Gorchetchnikov A., Hasselmo M. E. (2005). A biophysical implementation of a bidirectional graph search algorithm to solve multiple goal navigation tasks. Connection Science, 17(1-2), pp. 145-166.

Gorchetchnikov A., Hasselmo M. E. (2005). A simple rule for spike-timing-dependent plasticity: local influence of AHP current. Neurocomputing, 65-66, pp. 885-890.

Gorchetchnikov A., Versace M., Hasselmo M. E. (2005). A Model of STDP Based on Spatially and Temporally Local Information: Derivation and Combination with Gated Decay. Neural Networks, 18, pp. 458-466.

Gorchetchnikov A., Versace M., Hasselmo M. E. (2005). Spatially and temporally local spike-timing-dependent plasticity rule. In: Proceedings of the International Joint Conference on Neural Networks, No. 1568 in IEEE CD-ROM Catalog No. 05CH37662C, pp. 390-396.

Gorchetchnikov, A. 2017. An Approach to a Biologically Realistic Simulation of Natural Memory. Master's thesis, Middle Tennessee State University, Murfreesboro, TN, 70 pages.

Grossberg, S. (1973). Contour enhancement, short-term memory, and constancies in reverberating neural networks. Studies in Applied Mathematics 52, 213-257.

Grossberg, S., and Huang, T.R. (2009). Artscene: A neural system for natural scene classification. Journal of Vision, 9 (4), 6.1-19. doi:10.1167/9.4.6.

Grossberg, S., and Versace, M. (2008) Spikes, synchrony, and attentive learning by laminar thalamocortical circuits. Brain Research, 1218C, 278-312 [Authors listed alphabetically].

Hagen, T. R., Hjelmervik, J., Lie, K.-A., Natvig, J., and Ofstad Henriksen, M. 2005. Visual simulation of shallow-water waves. Simulation Modelling Practice and Theory 13, pp. 716-726.

Hasselt, Hado Van. Double q-learning. In Advances in Neural Information Processing Systems, pp. 2613-2621 ,2010.

Hinton, G. E., Osindero, S., and Teh, Y. (2006). A fast learning algorithm for deep belief nets. Neural Computation, 18, 1527-1554.

Ruesch, J. et al. 2008. Multimodal Saliency-Based Bottom-Up Attention a Framework for the Humanoid Robot iCub. 2008 IEEE International Conference on Robotics and Automation, pp. 962-965.

Rumelhart D., Hinton G., and Williams, R. (1986). Learning internal representations by error propagation. In Parallel distributed processing: explorations in the microstructure of cognition, vol. 1, Mit Press. 45 pages.

Rumpf, M. And Strzodka, R. Graphics processor units: New prospects for parallel computing. In Are Magnus Bruaset and Aslak Tveito, editors, Numerical Solution of Partial Differential Equations on Parallel Computers, vol. 51 of Lecture Notes in Computational Science and Engineering, pp. 89-134. Springer, 2005.

Salakhutdinov, R., & Hinton, G. E. (2009). Deep boltzmann machines. In International Conference on Artificial Intelligence and Statistics (pp. 448-455).

Schaul, Tom, Quan, John, Antonoglou, loannis, and Silver, David. Prioritized experience replay. arXiv preprint arXiv: 1511.05952, Nov. 18, 2015. 21 pages.

Schmidhuber, J. (2010). Formal theory of creativity, fun, and intrinsic motivation (1990-2010). Autonomous Mental Development, IEEE Transactions on, 2(3), 230-247.

Schmidhuber, Jurgen. Curious model-building control systems. In Neural Networks, 1991. 1991 IEEE International Joint Conference on, pp. 1458-1463. IEEE, 1991.

(56) References Cited

OTHER PUBLICATIONS

Seibert, M., & Waxman, a.M. (1992). Adaptive 3-D Object Recognition from Multiple Views. IEEE Transactions on Pattern Analysis and Machine Intelligence, 14 (2), 107-124.

Sherbakov, L. And Versace, M. (2014) Computational principles for an autonomous active vision system. Ph.D., Boston University, http://search.proquest.com/docview/1558856407. 194 pages.

Sherbakov, L. et al. 2012. CogEye: from active vision to context identification, youtube, retrieved from the Internet on Oct. 10, 2017: URL://www.youtube.com/watch?v=i5PQk962B1k, 1 page.

Sherbakov, L. et al. 2013. CogEye: system diagram module brain area function algorithm approx # neurons, retrieved from the Internet on Oct. 12, 2017: URL://http://www-labsticc.univ-ubs.fr/—coussy/neucomp2013/index_fichiers/ material/posters/NeuComp2013_final56x36.pdf, 1 page.

Sherbakov, L., Livitz, G., Sohail, A., Gorchetchnikov, A., Mingolla, E., Ames, H., and Versace, M (2013b) a computational model of the role of eye-movements in object disambiguation. Cosyne, Feb. 28-Mar. 3, 2013. Salt Lake City, UT, USA. 2 pages.

Sherbakov, L., Livitz, G., Sohail, A., Gorchetchnikov, A., Mingolla, E., Ames, H., and Versace, M. (2013a) CogEye: an online active vision system that disambiguates and recognizes objects. NeuComp 2013. 2 pages.

Smolensky, Paul. Information processing in dynamical systems: Foundations of harmony theory. No. CU-CS-321-86. Colorado Univ At Boulder Dept of Computer Science, 1986. 88 pages.

Snider, Greg, et al. "From synapses to circuitry: Using memristive memory to explore the electronic brain." IEEE Computer, vol. 44(2). (2011): 21-28.

Spratling, M. W. (2008). Predictive coding as a model of biased competition in visual attention. Vision Research, 48 (12):1391-1408.

Spratling, M. W. (2012). Unsupervised learning of generative and discriminative weights encoding elementary image components in a predictive coding model of cortical function. Neural Computation, 24(1):60-103.

Spratling, M. W., De Meyer, K., and Kompass, R. (2009). Unsupervised learning of overlapping image components using divisive input modulation. Computational intelligence and neuroscience. 20 pages.

Sprekeler, H. On the relation of slow feature analysis and laplacian eigenmaps. Neural Computation, pp. 1-16, 2011.

Sun, Z. et al., Recognition of Sar target based on multilayer auto-encoder and Snn, International Journal of Innovative Computing, Information and Control, vol. 9, No. 11, pp. 4331-4341, Nov. 2013.

Sutton, R. S., and Barto, A. G. (1998). Reinforcement learning: an introduction(vol. 1, No. 1). Cambridge: Mit press. 10 pages.

Tong, F., Ze-Nian Li, (1995). Reciprocal-wedge transform for space-variant sensing, Pattern Analysis and Machine Intelligence, IEEE Transactions on , vol. 17, No. 5, pp. 500-51. doi: 10.1109/34.391393.

Torralba, A., Oliva, A., Castelhano, M.S., Henderson, J.M. (2006). Contextual guidance of eye movements and attention in real-world scenes: the role of global features in object search. Psychological Review, 113(4).766-786.

Van Hasselt, Hado, Guez, Arthur, and Silver, David. Deep reinforcement learning with double q-learning. arXiv preprint arXiv:1509.06461, Sep. 22, 2015. 7 pages.

Versace, M. (2006) From spikes to interareal synchrony: how attentive matching and resonance control learning and information processing by laminar thalamocortical circuits. NSF Science of Learning Centers Pi Meeting, Washington, DC, USA. 1 page.

Versace, M., (2010) Open-source software for computational neuroscience: Bridging the gap between models and behavior. In Horizons in Computer Science Research, vol. 3. 43 pages.

Versace, M., Ames, H., Leveille, J., Fortenberry, B., and Gorchetchnikov, a. (2008) KInNeSS: A modular framework for computational neuroscience. Neuroinformatics, 2008 Winter; 6(4):291-309. Epub Aug. 10, 2008.

Versace, M., and Chandler, B. (2010) MoNETA: a Mind Made from Memristors. IEEE Spectrum, Dec. 2010. 8 pages.

Versace, TEDx Fulbright, Invited talk, Washington DC, Apr. 5, 2014. 30 pages.

Webster, Bachevalier, Ungerleider (1994). Connections of IT areas TEO and TE with parietal and frontal cortex in macaque monkeys. Cerebal Cortex, 4(5), 470-483.

Wiskott, Laurenz and Sejnowski, Terrence. Slow feature analysis: Unsupervised learning of invariances. Neural Computation, 14(4):715-770, 2002.

Wu, Yan & J. Cai, H. (2010). A Simulation Study of Deep Belief Network Combined with the Self-Organizing Mechanism of Adaptive Resonance Theory. 10.1109/CISE.2010.5677265, 4 pages.

\* cited by examiner

METHODS AND APPARATUS FOR EARLY SENSORY INTEGRATION AND ROBUST ACQUISITION OF REAL WORLD KNOWLEDGE

CROSS-REFERENCE TO RELATED PATENT APPLICATION

This application is a continuation application of U.S. application Ser. No. 14/947,516, now U.S. Pat. No. 10,300,603, filed Nov. 20, 2015, and entitled "Methods and Apparatus for Early Sensory Integration and Robust Acquisition of Real World Knowledge," which is a bypass continuation of International Application No. PCT/US2014/039239, filed on May 22, 2014, and entitled "Methods and Apparatus for Early Sensory Integration and Robust Acquisition of Real World Knowledge," which claims priority, under 35 U.S.C. § 119(e), from U.S. Application No. 61/826,387, filed May 22, 2013, and entitled "METHODS AND APPARATUS FOR PATH INTEGRATION AND NEURAL ACQUISITION OF LOCATION ESTIMATE." Each of these applications is hereby incorporated herein by reference in its entirety.

GOVERNMENT SUPPORT

This invention was made with government support under Contract No. NNX12CG32P awarded by NASA. The government has certain rights in the invention.

BACKGROUND

To date there has been little success in development of robotic intelligent behaviors without reliance on resource-intensive active sensors such as but not limited to laser range finders, sonars, etc. Furthermore, these sensors are often tailored and used exclusively for individual tasks. At the same time, robots do have other multi-purpose passive sensors, but the precision of knowledge based on these sensors leaves much to be desired. The lack of reliable cross-task sensory system is partially due to sensory noise and partially to an approach of independent, stove-piped processing of individual sensory streams.

SUMMARY

The system and methods described herein is based on a combination of an arbitrary number of sensory inputs correcting each other by compensating weaknesses of one sensor with the strengths of other sensors in the process of early fusion, then processing these sensory inputs through a redundant and robust neural-like system. An exemplary system may be used for a variety of applications, including but not limited to spatial navigation, visual object segmentation and recognition, or robotic attention.

In some implementations, the system may generate a noise-tolerant distributed data representation model via generating a set of data cells collectively representing a sensory input data point in the range of measurement for a particular type of data, and may use the data to define a spatial or temporal resolution of the set of data cells (e.g., a data representation model) from the data range of the incoming sensory information and the number of cells in the set. A spatial or temporal scale for the representation may be determined using the range of the incoming sensory information, and may be used to generate a set of graph connections among the set of data cells with a first set of weights (in some implementations, these connections are designed to ensure continuity between representation of points in continuous space and some distance measure so that data cell representation reflects the distance between input data points).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

This disclosure is subdivided in several sections. The first section describes the basic principles of the biological sensory processing and claims how they can be applied to improve robotic and other engineering applications. The next section describes an example robotic navigational system that is based at least on the principle of the first section and is used to test the applicability of the presented approach. The disclosure presents an example of an artificial visual system that illustrates applicability of the principles in the first section to a completely different domain thus implying the generality of these principles. It also discloses a software layer that allows communication between neural models based on the principles of the first section and built in various software packages with robotic or virtual sensory motor scenarios that allow testing and further development of the above principles.

Biological Sensory Processing and Engineering Practices

Sensory information processing in an animal nervous system model differs from conventional engineering approaches in several respects: data representation, horizontal interactions between processing streams within and across modalities, and feedback from higher level results to early processing stages within and across processing streams. Neural-like data representation, as well as neural horizontal and feedback interactions deliver advantages in engineering of artificial information processing systems, as detailed below.

Data Representation

In order to save resources, engineers try to minimize the representation of the sensory data. Whether it is luminance of a visual or radar pixel, acceleration, or sound pitch, conventional systems tend to represent it as a single floating point number with possible duplication or even triplication for the systems where robustness is important. This does not prevent the data from experiencing abrupt changes due to noise. Consequences of this include disregarding a temporal continuity of the physical world around us and (without additional processing) not establishing a relationship between nearby values, thus disregarding a spatial continuity of the world.

Figure 1A:
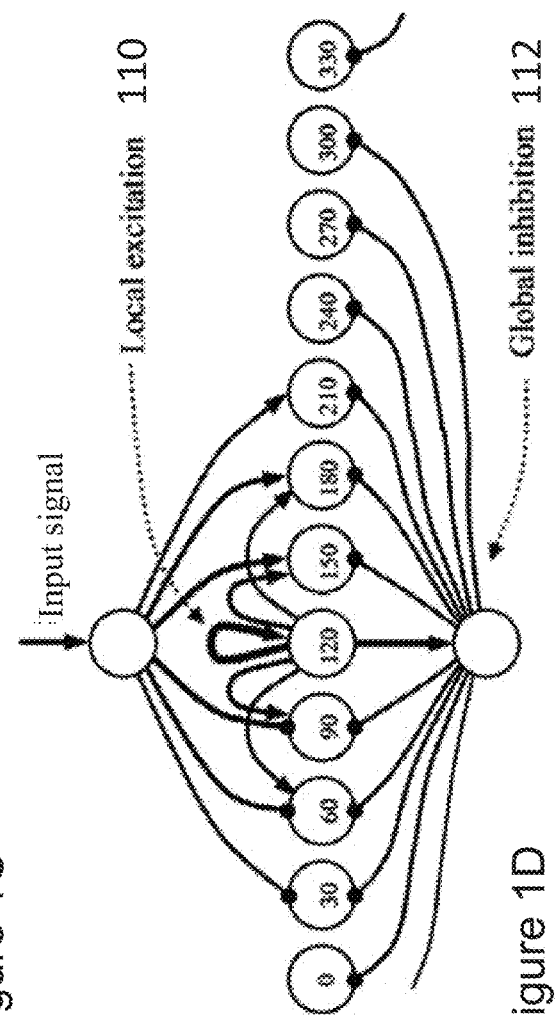
FIG. 1A shows experimental recordings from a visual cortex that illustrate continuity of sensory data and its representation in the brain.
Figure 1B:
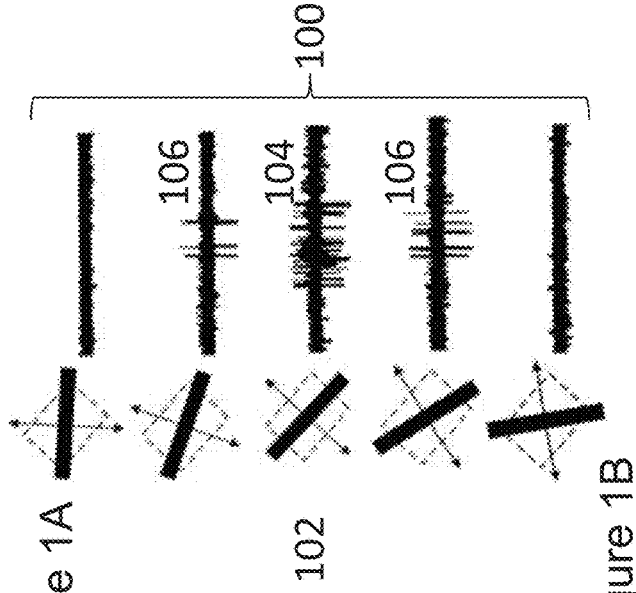
FIG. 1B shows an example tuning curve for the experimental data shown in FIG. 1A.
Figure 1C:
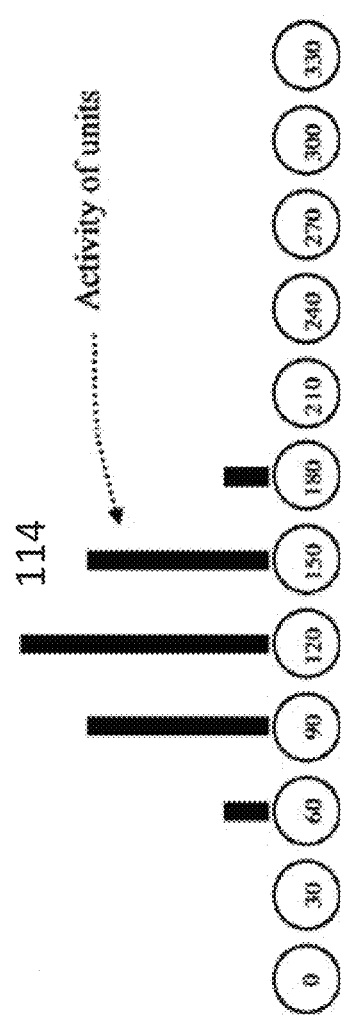
FIG. 1C shows an example of neuronal representation with narrow on-center (local excitation) and wide off-surround (global inhibition, this is the extreme case when the surround includes all other cells).
Figure 1D:
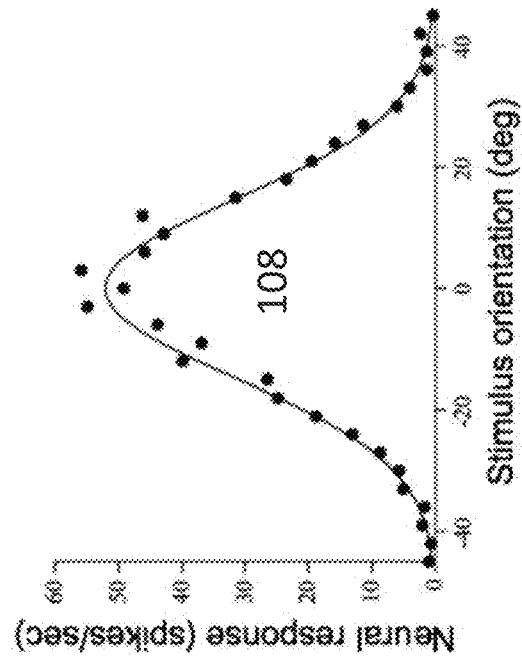
FIG. 1D shows an example of a neuronal representation of an animal's heading.

FIGS. 1A-1D illustrate a neural representation which uses ensembles of cells to represent every data point, which sacrifices the storage space for the sake of robustness and preserving the continuities of the world. Specifically, FIG. 1A illustrates this principle for a cell population that codes the orientation of a bar in a visual field of an animal from experimental recordings. In visual cortex a set of cells 100 that represent orientations exist for each point in the visual space, and if a bar of a certain orientation 102 appears at this point not only the cell with the corresponding orientation becomes active 104 but so do cells with nearby orientations 106, the closer their preferred orientations are to the one presented, the higher is the cell activation (so called tuning curve of the cell). As a result, for each data point there is a distributed bell-shaped representation 108 (shown in FIG. 1B) that is centered at the precise value of the preferred orientation and gradually decaying as the nearby cells tuning moves away from this value. This distributed representation is ubiquitous in the nervous system, and is used to represent headings in parasubiculum, places in the hippocampus, tones in auditory cortex, and many other sensory readings or processed data. FIG. 1C illustrates how the neurons may be connected to achieve such a representation using local excitation 110 and global or long range inhibition 112. FIG. 1D shows the activities of the resulting cells showing bell-shaped profile for a particular input (114).

This representation bears several advantages. First, it is more resistant to damage to the processing hardware. For example, the head direction cells that represent the animal's heading may have tuning curves about 90 degrees wide, which suggests that losing the heading signal completely involves losing at least a quarter of head direction cells. Even then, losing a quarter of the heading cells may affect only a quarter of possible headings.

The second advantage of the neuronal representation is preservation of the continuity of the world. The cells in the representation are not standalone memory elements, but a connected ensemble. Usually this connectivity follows some version of on-center off-surround (e.g., Mexican hat) profile, where the cells excite nearby (in terms of data values or tuning curves) cells and inhibit cells that are further away. This connectivity creates an attractor dynamics where it is easy to shift from the current data value to nearby values, but where it is much harder to shift to further away values. This reflects a natural continuity of data: if a person is facing East at one moment, it is virtually impossible for that person to face West in the next moment, and much more likely that the person's heading would still be very close to East the next time the person's heading was requested. From an engineering standpoint, this implementation may also work as a low-pass filter, which can be a first cascade in the sensory processing that serves to reduce or eliminate the high frequency jitter most sensors produce. Therefore, for the fair comparison of storage and processing requirements of state of the art engineering system and biological system we should compare the initial data representation of the latter with a combined data representation and low-pass filter of the former. Using attractor on-center off-surround dynamics may increase the robustness of the representation for continuous values.

Figure 2:
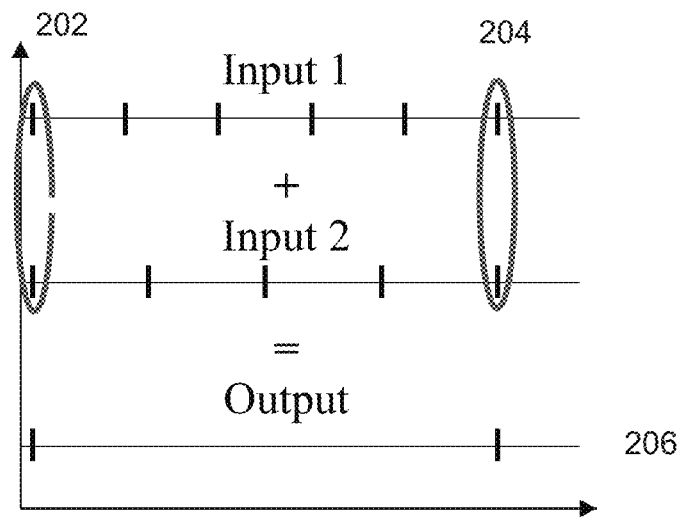
FIG. 2 is an illustration of beats of low frequency created by overlapping two higher frequencies. This can be used in space or time to encode intervals in wide ranges using only a limited set of base frequencies. Vernier scale and hyperacuity is related to the inverse application of this principle.

Furthermore, biological systems often utilize multiple scales of on-center off-surround connectivity (corresponding to low-pass filter frequencies) through different lengths of on-center and off-surround connections, resulting in multiple scales of sensory representation. This allows the brain not only to process information at an appropriate scale (e.g., one does not need to know the distance between Boston and New York in feet in order to plan a trip) but also to dynamically switch between scales (e.g., gradually increase one's resolution as one approaches one's destination in New York). Due to a principle of beats phenomenon that occur when one combines two nearby frequencies 202 and 204 and produces a signal with a significantly lower frequency 206 (e.g., as shown in FIG. 2), a limited set of base scales can allow for representing a wide range of data (e.g., up to least common multiple of the scales) with high precision (e.g., at least as high as the smallest scale) without a necessity to involve large numbers of cells in the representation. Furthermore, interactions between multiple scales can lead to phenomenon of hyper-acuity, when the information derived from the representation has higher resolution than the original sensory data (this is based on the same principle as Vernier scale used in engineering for precise measurements). This principle can be generalized, and can be applicable as long as there is either spatial or temporal extent in the input signal.

To summarize, using neuronal-like data representation on every processing stage allows robustness of the system, built-in low pass filtering, increase in data precision beyond the precision of a sensor, preservation of spatial and temporal continuity of the signal, and easily scalable ability to handle wide ranges of data with high precision. Bell shaped and often Gaussian profiles of neuronal activity are also very convenient for combining signals from different inputs as discussed in the next section.

Horizontal Interactions Between Processing Streams within and Across Modalities

A conventional solution for processing multiple sensory streams is to stove-pipe several algorithms, each being finely tuned for a specific task, and combine their outputs for further analysis and guidance of actions. For example, visually estimated self motion is often used to correct odometry-based motion estimates, but it is usually done in discrete steps, rather than continuously, and by resetting the odometry data, rather than fusion of two sensory streams. Each individual algorithm is a result of a long effort to achieve maximal performance for a certain task; however these algorithms in aggregate rarely allow meaningful use of the results of intermediate processing stages. Furthermore, combining the algorithms involves reducing the interdependencies between processing streams to keep the system tractable, leading to little information about how the processing streams relate to each other.

Figure 3:
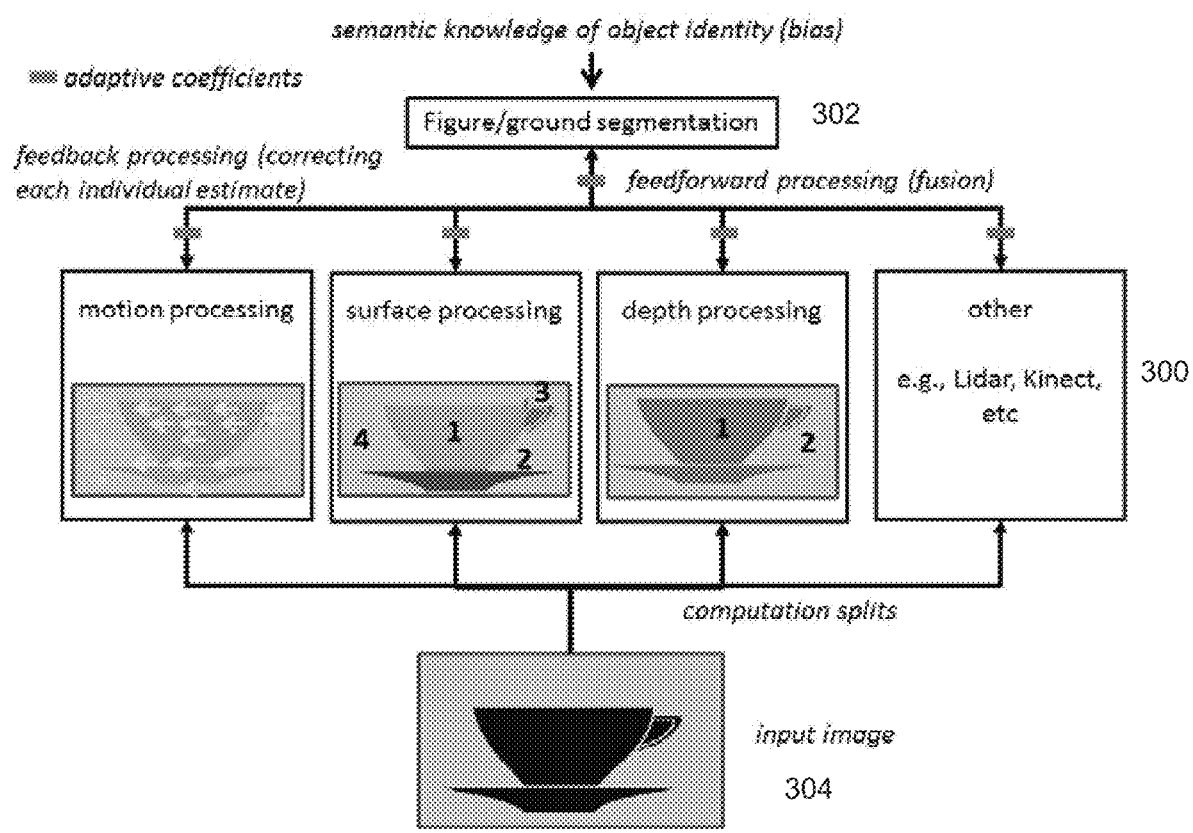
FIG. 3 illustrates the process of segmenting objects from their "background", by adaptively combining in a feedforward/feedback process various sources of potentially imprecise/noisy visual and non-visual information to estimate what is figure and what is ground, and create a form-fitting (or object-fitting) mask to enable segmentation of the object of interest.

An approach based on biological principles may involve improving processing, within each stream, using the early and intermediate results of the stream along with other streams. Such an approach may be used, for example, with image segmentation by the visual system. The visual system may be configured to allow a user to build an accurate representation of the world, including relative positions of all objects and how they move with respect to an entity (e.g., a robot). A conventional approach would be to select objects of interest, fine tune detection algorithms for these objects, and use outputs of these algorithms to feed motion detection. A human brain's approach is quite different; it extracts the information from the visual input in parallel, and uses different feature sets 300 of this information to help processing of other features 302 as early as it is useful and long before the objects are detected and identified 304 (e.g., see FIG. 3). In the example implementation of an OpenEye system discussed below, determining the boundary of an object can be done using a change in luminance, color, texture, or other surface property, as well as depth information that can come from binocular disparity or from accommodation of the eye, and discontinuities in the motion signals like optic flow. All of these cues can be combined on the early stages of processing.

Furthermore, at this stage the system does not need to know what the objects are, and how many are there; it may be completely agnostic towards identifying objects. As a result, the output of these interactions—a video stream segmented into areas that have similar properties and move together—can be used for a plurality of types of object detection and recognition, thus unifying a significant chunk of processing and making it scalable for any arbitrary number of objects. Additionally, the object-aware part of the system may become independent of the number of sensors used to produce visual segmentation, and can be reused, for example, on different robots with different sensory compositions. Since motion, depth, and different surface properties are processed at different resolution (e.g. motion signals may have coarser resolution than surface property signals), the system may also utilize all advantages that come with multiple scales of neuronal representations outlined in the previous section. Various modalities and even data extraction methods of sensory processing often provide incomplete and imprecise results. Early fusion of the outputs of these algorithms and modalities makes it possible to feed more complete and precise data to computationally expensive high-order processing algorithms.

Another advantage of early interactions between sensory processing streams may be a shortened response time. For example, for the human brain, interaural differences in sound arrival timings allow the brain to detect the source of sound in space. This detection happens early in the auditory stream in the inferior part of colliculus before the information reaches even the primary auditory cortex. The superior part of colliculus controls eye movements, and a direct link from the auditory stream to visual stream allows humans to move their eyes towards the source of sound long before they can recognize what this sound is. Similarly, a quick estimate of optic flow by a vehicle can be used to determine that there is an object on a collision course with this vehicle and trigger an avoiding maneuver before the nature of the colliding object is processed. The linkage between early sensory processing stages and fast motor responses may reduce response times for important inputs.

Figure 21:
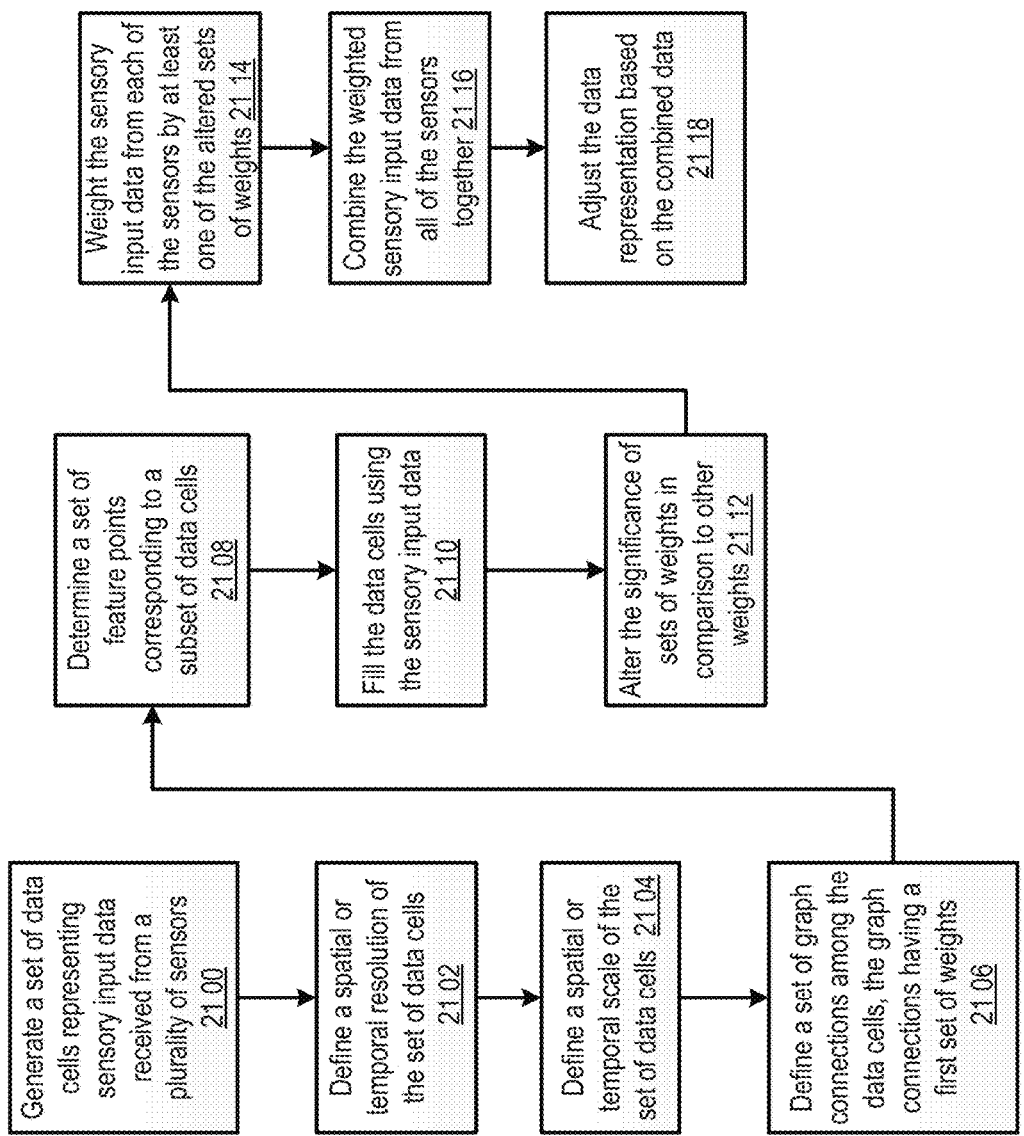
FIG. 21 shows a flow chart illustrating an exemplary embodiment of path navigation.

In some implementations (referring to FIG. 21), a system may generate a set of data cells 2100, the set of data cells representing sensory input data received from a group of sensors. The sensor may use the set of data cells to both determine a spatial and/or temporal resolution 2102 of the set of data cells, and to determine a spatial and/or temporal scale 2104 for the set of data cells and the range of available data. In some implementations the resolution may refer to the size of the data set with respect to the range of data. The system may then define a set of weighted connections from the data cells 2106, to the combined representation 2116. Fill in the sensory data 2110. Using the apriori information about each sensor precision, the system may alter the significance of the weights from each set of data points in 2112, e.g., based on the precision of the source of the data represented by each set of weights, and/or the like. The system may weight the sensory input data from each of the sensors 2114 based on the altered sets of weights, and may combine the weighted sensory input data 2116. The weighted sensory data may be fed back into the system in order to update data representation in 2110 as in 2118. Iterate through the loop between 2110 and 2118 as long as new sensory data comes in.

Figure 4:
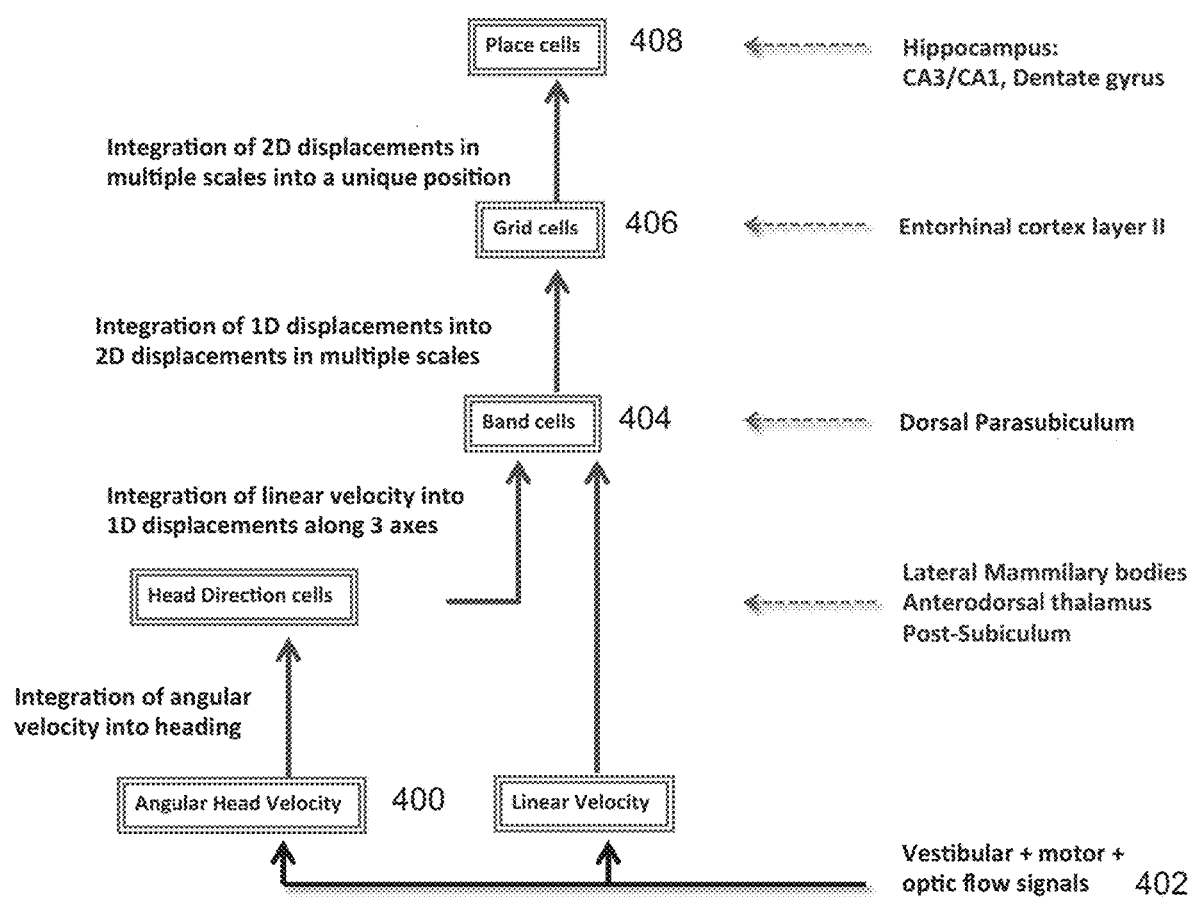
FIG. 4 depicts a biological path integration system. On the right, FIG. 4 names the mammalian brain areas subserving path integration. On the left it describes core modeling work that was combined to create an example PInNAcLE implementation.

Another illustration of across modality interactions is a Path Integration and Natural Acquisition of Location Estimate (PInNAcLE) system based on biological path integration illustrated in FIG. 4. In some implementations, the PInNAcLE system transforms velocity data 400 recorded from the agent's sensors and actuators into the robot's world position. The basic element of the system is a ring attractor network. Here the inputs from three sensory modalities 402 are combined: motor outflow, which precedes the motion, but can be incorrect since the body might be restrained and the effectors might slip; IMU input, which is slightly delayed and has issues with detecting very slow motions (see Table 1); and optic flow, which is good for slow rotations but becomes increasingly inaccurate as the speed increases and cannot estimate linear motions without additional information.

TABLE 1

Calibration of a ring attractor from FIG 1. Left column shows the size of a network in cells, top row shows a normalized between 0 and 1 angular velocity input, values in the table show attractor rotation in degrees per second. The empty cells show where the input was too small for the attractor to respond, bold font shows where attractor performed at the edge of losing precision due to small values of the input.

| Size\Normalized input | 0.0001 | 0.0002 | 0.0004 | 0.001 | 0.002 | 0.004 | 0.01 | 0.02 | 0.04 |
|---|---|---|---|---|---|---|---|---|---|
| 36 | | | | | | | | 0.14 | 0.34 |
| 72 | | | | | | | 0.085 | 0.18 | 0.36 |
| 180 | | 0.002 | 0.004 | 0.01 | 0.018 | 0.036 | 0.092 | 0.184 | 0.368 |
| 360 | 0.001 | 0.002 | 0.004 | 0.009 | 0.018 | 0.037 | 0.092 | 0.184 | 0.368 |
| 720 | 0.001 | 0.002 | 0.0035 | 0.009 | 0.0185 | 0.037 | 0.0925 | 0.1845 | 0.3685 |

Each of these streams has advantages and disadvantages relative to others and a proper fusion of this information within the PInNAcLE system allows these streams to capitalize on the advantages of early sensor fusion and also to self-correct problems with different sensors. The resulting system can reliably track the vehicle position during extended periods of exploration.

PInNAcLE derives estimate of current heading from each of the three inputs and represents these estimates as shown in FIG. 1B. The Gaussian shape of these signals simplifies their combination, as the sum of Gaussians that are close enough together (how to ensure this condition is discussed in the next section) is also a Gaussian. But simple sum may not suffice; in some implementations, the motor input may only be considered if it is backed up by either vestibular or optic flow, while the latter two may be weighted proportionally to the movement speed, with optic flow having more weight for slow speeds and vestibular having more weight for fast speeds. The resulting heading estimate 500 may take advantage of predictive power of motor outflow and high precision of vestibular input at high speeds and optic flow at low speeds (e.g., see FIG. 5).

In some implementations, optic flow (e.g., the set of local motions perceived across the visual field at a particular time), provides a distributed and robust cue for navigation. Biological organisms use optic flow for navigation; for example, when human visual and vestibular senses are in conflict, the visual sense of self-motion can often times overpower the vestibular one. An optic flow system is included in the model (described below) in order to leverage this source of information as a complementary signal to vestibular and motor commands for path integration. The custom algorithm used to determine optic flow is a hybrid of two models.

Firstly, an initial optic flow field is calculated using monogenic filters, which have been useful for fast optic flow computation. These filters are computationally efficient (especially on a parallel GPU-enabled platform) and naturally illumination-invariant because they are based on a local image phase only. Because the signal is local, however, it is often noisy; this noise can be dampened by spatiotemporal smoothing.

Thus, a method of smoothing the monogenic signal was developed based on a motion integration algorithm. In some implementations the algorithm estimates agent velocity parameters from the optic flow field according to a pinhole camera model.

Monogenic Filters

The optic flow field (e.g., a 2D vector field over an image) is first constructed by calculating a set of features over the image and then correlating those features over time. The optic flow system extracts local image phase information through a set of monogenic filters over a set of spatial scales s. Monogenic filters are based on Gabor wavelet filters, which balance some spatial and some frequency selectivity. They can be parameterized by their center spatial frequencies; the algorithm uses a particular set of center frequencies spaced geometrically according to $$\mu_s = \mu_0 \cdot \gamma^{-s},$$

where $\mu_0 = 0.25$ is the highest-frequency filter scale, subsequent filters are scaled by a factor $\gamma = 1.3$, the number of spatial scales $n_s = 6$, and so the set of spatial scales $s \in \{0, \ldots, 5\}$.

Monogenic filters are based on bandpass filters $G_{f_x f_y s}$. The general shape of one bandpass filter is given by a Gaussian function in polar coordinates, which produces a ring in image frequency space:

$$F_{f_x f_y}(\mu, \sigma) = \frac{1}{2\pi\sigma_r} \exp\left(\frac{(f_r - \mu)^2}{-2\sigma^2}\right),$$

where the radial component $f_r$ is given by $$f_r = \sqrt{f_x^2 + f_y^2}.$$

This ring can be re-parameterized exclusively by the spatial scale s, in which case the width of the ring scales with the center frequency $\mu_s$:

$$G_{f_x f_y s} = F_{f_x f_y}(\mu_s, 0.85\mu_s).$$

This bandpass filter estimates the amplitude of local frequency at an image; the local angle and phase at that frequency is estimated with filters that select for horizontal or vertical frequency energy. These two real-valued filters can be combined into one complex filter $H_{f_xf_y}$ to save on computational resources:

$$H_{f_xf_y} = \frac{if_x - f_y}{f_r}.$$

To get the complete monogenic signal, the image $I_{xyt}$ is transformed into ordinary frequency space with the Fourier transform $\mathcal{F}: (x,y) \rightarrow (f_x,f_y)$, multiplied by the set of band-pass filters, and then transformed back into the original image space.

$$\vec{a}_{xyst} = \begin{bmatrix} \mathcal{F}^{-1}[\mathcal{F}(I_{xyt})G_{f_xf_ys}] \\ \mathcal{R}(\mathcal{F}^{-1}[\mathcal{F}(I_{xyt})G_{f_xf_ys}H_{f_xf_y}]) \\ \mathcal{I}(\mathcal{F}^{-1}[\mathcal{F}(I_{xyt})G_{f_xf_ys}H_{f_xf_y}]) \end{bmatrix} = \begin{bmatrix} a^{(1)}_{xyst} \\ a^{(2)}_{xyst} \\ a^{(3)}_{xyst} \end{bmatrix}.$$

Note that, since $I_{xyt}$ and $G_{f_xf_ys}$ are both real-valued, and the resulting filtered signal is also real-valued ($\vec{a}_{xyst} \in \mathbb{R}^3$). Changing this monogenic signal into spherical coordinates can recover the three components of local image phase: amplitude, angle, and phase roll.

The difference in this monogenic signal over time produces an optic flow field. The monogenic filter signals are specifically compared between time frames for a change in local estimated phase, which is taken as an estimate of local image movement in the direction of the monogenic signal's estimated phase angle. The following equation, based on quaternion rotation, keeps the movement vector in the same monogenic space:

$$\vec{b}_{xyst} = \begin{bmatrix} \vec{a}_{xys(t-1)} \cdot \vec{a}_{xyst} \\ a^{(1)}_{xys(t-1)} a^{(2)}_{xyst} - a^{(1)}_{xyst} a^{(2)}_{xys(t-1)} \\ a^{(1)}_{xys(t-1)} a^{(3)}_{xyst} - a^{(1)}_{xyst} a^{(3)}_{xys(t-1)} \end{bmatrix}.$$

Spatiotemporal Smoothing

The monogenic optic flow signal is efficient and local, but this spatial locality can produce unwanted noise in the resulting optic flow field. This noise can be reduced through a process of spatiotemporal smoothing. The following method of smoothing the monogenic signal was loosely based on a model of biological motion integration. This motion integration process allows for some amount of local smoothing while retaining the computational efficiency of monogenic filters. More complicated smoothing algorithms may be useful for scenes with independently moving objects.

The main smoothing process, loosely identified with the primary visual cortex, V1, takes the input flow signal, averages that signal over space and time, and incorporates feedback that averages over spatial scales. The process of averaging over spatial scales roughly corresponds to the functional role of a downstream motion-sensitive brain area, the middle temporal area (MT). This averaged value can be read by other parts of the model as the final optic flow signal.

Egomotion Estimation

Finally, the optic flow signal is used to estimate the camera's rotation, and thus the rotation velocity of the agent. This is done by projecting the optic flow field onto a template field that linearly scales with camera rotation speed. The template field only depends on the pixel position (x,y) and the camera parameters, namely, the focal length $\alpha$ and the physical pixel size $\beta$. Note, however, that the pixel indices range from negative to positive rather than starting at 0 or 1; for example, for a 640×480 image, $x \in \{-319.5, -318.5, \ldots, 319.5\}$ and $y \in \{-239.5, -238.5, \ldots, 239.5\}$. The template field is given by $$\vec{R}_{xyt} = \frac{-1}{\alpha} \begin{bmatrix} \alpha^2 + (\beta x)^2 \\ \beta^2 xy \end{bmatrix},$$

and the projection operation can be written as $$r_t = \frac{\sum_{xy} \vec{R}^T_{xyt} \cdot \vec{v}_{xyt}}{\sum_{xy} \|\vec{R}_{xyt}\|^2}.$$

If a spherical camera model such as the one initially proposed were used instead, then the template field $\vec{R}_{xyt}$ would be independent of pixel position. This simplification would allow for less memory storage but offers little to no speed advantage over the current image plane method. This contrasts with the calculation of linear velocities of optic flow, which depend on an estimate of depth at every pixel that changes over time as well as space, requiring more computational resources and communication. Unfortunately, modeling a spherical camera in the virtual environment poses particular challenges because OpenGL is heavily optimized for graphics in Cartesian coordinates. A spherical camera projection would require that all straight lines between triangle vertices to be deformed into curved lines on the camera sensor. The results determined by simulation shown below show that the pinhole camera model is sufficiently fast and accurate for egomotion estimation in the virtual environment.

Inertial measuring units (IMUs) have three sources of error with decreasing magnitude: Static Bias, Dynamic Bias and Random White Noise. Static bias is reduced by recalibrating the IMU between runs when the vehicle is stationary. Dynamic bias occurs during the mission while the vehicle is underway and if not addressed can lead to drift—where the error from the previous position estimate further impacts the next position estimate. The correction of this drift can happen independently for rotational IMUs (gyroscopes) and translational IMUs (accelerometers) from the segregated optic flow or other flow field for example sonar depth field through time. Full flow field can be separated into depth-invariant component that represents rotation of the vehicle and depth-dependent component that represents its translation. Periods of time when there is no rotational flow can be used to recalibrate rotational IMUs, and periods with no translational flow can be used to calibrate translational IMUs. Effectively, this is a natural continuation of the weighted approach described in the previous paragraph: when the perceived motion is zero optic flow or sonar flow has its maximal effect on the position estimate.

Sensory fusion may weight the importance of incoming signals and modalities depending on the state of the system and the advantages of individual sensory streams. Some states shall be used to perform on-the-fly recalibrations of the sensors that can show significant drift during extended performance.

Figure 6:
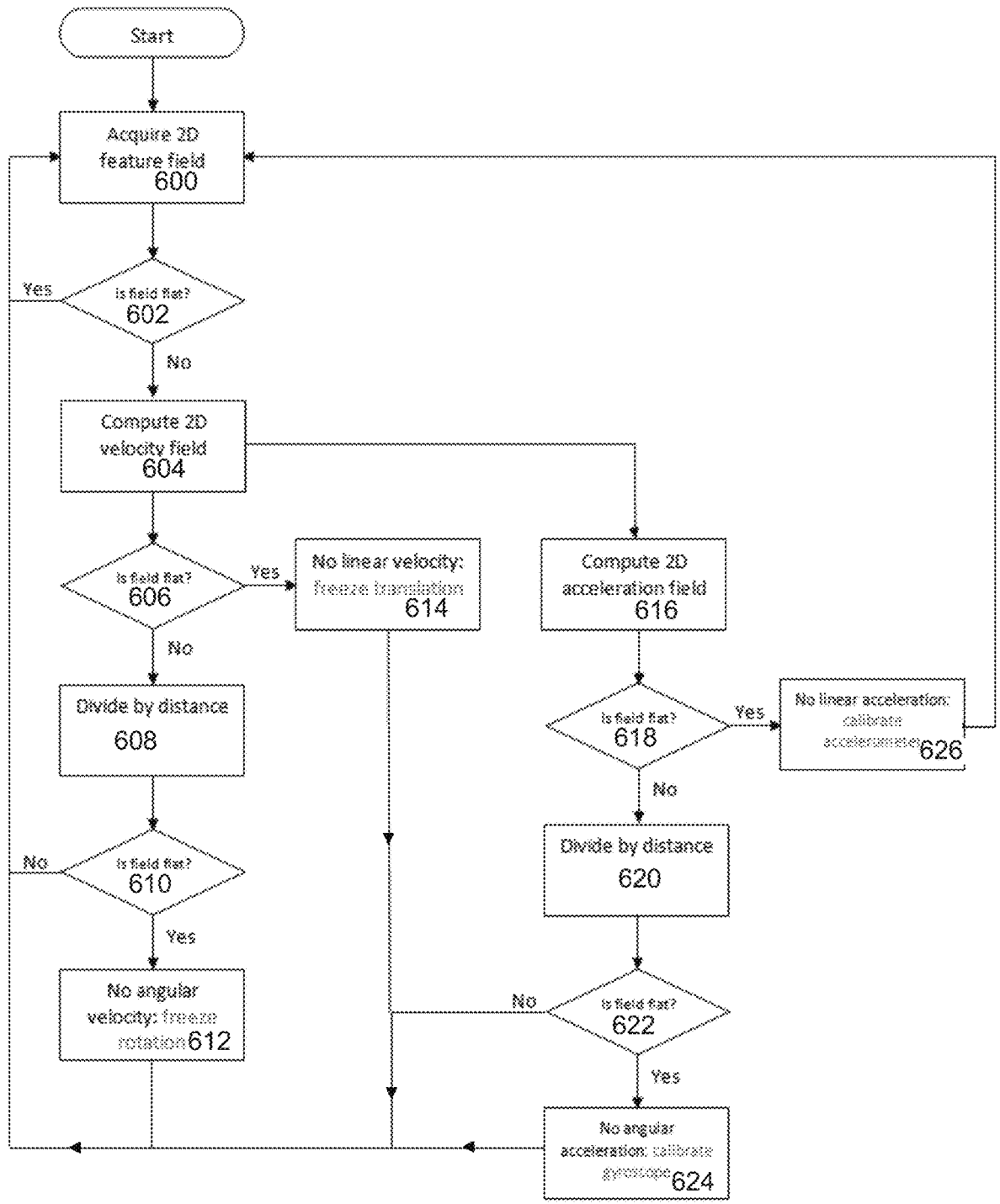
FIG. 6 shows an example flow chart for IMU on the fly calibration algorithm using flow field information.

FIG. 6 presents an example flow chart for this algorithm. System acquires feature field, for example an optic flow field on every iteration or frame 600. If there is no signal the field will be flat with all values equal 0, so the system proceeds to the next frame 602. If there is signal, then the system computes a velocity field by taking difference between this frame and the previous frame 604 and acceleration field by taking the difference between velocity field from the previous frame and the newly computed one 616. It may then determine whether the velocity field is flat 606. The velocity field can be flat only when there is no linear motion 614, so the system can override other inputs and ensure that the coordinate of the agent does not change its representation. After dividing the velocity field by distance 608 the system may determine if the field is flat 610; dividing may produce a flat field only if there is no angular motion 612, so the system can be sure that the heading of the agent does not change. Acceleration field 616 is used in a similar fashion to determine angular and linear accelerations and signal an opportunity to recalibrate IMUs when respective accelerations are 0 (e.g., the system checks to see if the acceleration field is flat 618, and may calibrate the accelerometer 626 if the field is flat; if the field is not flat, the system may divide the acceleration field by distance 620, and if the field has become flat 622, the system may calibrate the accelerometer 624.

Linear displacement is first estimated along three axes in the plane; the use of three axes instead of two provides redundancy and error detection (band cells 404 in FIG. 4). Each axis has a set of corresponding ring attractors—all having a preferred direction aligned with the axis, but each having different spatial scales: the displacement covered by one full rotation of attractor around the ring. The neural system achieves its best localization results with spatial scales related to each other as different prime numbers (e.g. 7 to 11 to 17 for three scales). The merged heading estimate is filtered through a pair of Gaussian filters (one positive and one negative, centered 180 degrees apart from each other) to produce a cosine of an angle between the current heading and a preferred direction of a linear displacement ring attractor. This cosine, multiplied by the linear velocity of the agent (estimated by different sensory inputs), serves as an input to the corresponding set of ring attractors. The merged displacement estimates along axes are combined together into 2D displacement within the corresponding spatial scale (grid cells 406 in FIG. 4). Finally, 2D maps of different spatial scales are merged together to produce a unique (within a map) current location estimate for the robot with respect to its starting location (place cells 408 in FIG. 4).

Note that the final output of PInNAcLE system is an estimate of the agent's position and orientation in space, but instead of estimating these outputs from three different sensory inputs independently the information is combined on the stages of heading estimation and linear displacement estimation, and these combined more precise estimates are used downstream to produce final results. Similar to the visual processing example above, this downstream system also is independent of the sensory composition of early processing in PInNAcLE.

To summarize, unlike the vertical streams of processing used in conventional approaches, the biological approach suggests high level of horizontal interactions between streams and clear separation of processing stages in terms of defining intermediate outputs that can be used elsewhere in the system.

Feedback from Late Stages to Early Stages within and Across Processing Streams.

Introduction of continuous delayed feedback in the system induces oscillatory regimes that usually complicate both mathematical analysis and performance tuning of the system. As a result, state of the art solutions for sensory processing tend to utilize corrective feedback mainly in the form of discrete resets. Furthermore, as a consequence of vertical stove-piping, the results of many sensory estimates are not trustworthy enough to use as a corrective feedback. For example in loop-closure solutions visual input is used to recognize whether the agent completed the loop during navigation, and if so it is used to correct odometry-derived position estimate. Rarely if ever odometry is used to affect decision making on whether the loop was closed. As a result, the system makes errors when a view is identical in different parts of the environment (which happens often indoors), while a feedback from odometry could have eliminated a significant portion of these errors that just could not be loops even with low precision of odometers.

Figure 5:
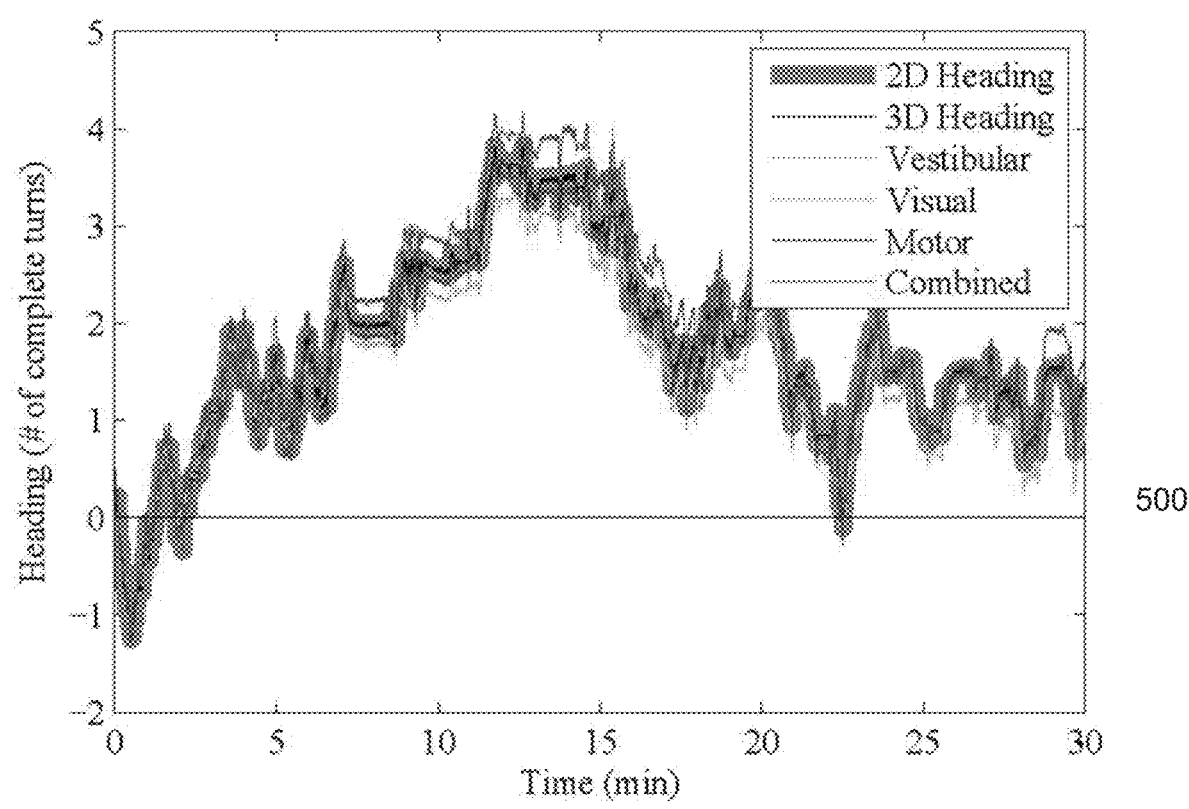
FIG. 5 shows the results of PInNAcLE system. Individual motor, vestibular and optic flow (visual) based estimates are plotted without feedback correction described below and show consistent overshoot for motor and undershoot for optic flow. Combined estimate follows the true heading (2D and 3D headings) much closer.

The brain on the other hand is an inherently oscillating system that shows us how oscillations can be utilized for synchronization, noise reduction, and dynamic control. Since brain puts oscillations to use rather than avoid them, the dynamic feedback is a key mechanism in the brain functionality and can be utilized for much more than just corrective input. FIG. 5 shows how in PInNAcLE the fast motor input by itself tend to overshoot the motion, while optic flow based signal tends to undershoot, primarily because it takes longer to process and thus comes with a delay. Results of heading estimates from all sensors are merged together in a weighted fashion described in the previous section, allowing the system to take advantage of the best ranges of precision of individual sensors. The result of this merge is computed in the ring representing the final estimate and then provided back to individual sensors, correcting the individual errors and ensuring that all sensory estimates stay tuned to each other and do not diverge with time. In some cases, early corrective feedback to sensory readings reduce error in the system on early stages of processing.

Providing corrective feedback to these signals from a combined version on one hand introduces more inertia in the system (consider it another low-pass filter) and on the other hand allows keeping the Gaussians of all individual estimates within a short range of each other (as discussed in the previous section it is required for successful combining of these signals). Furthermore, the level of feedback can determine how much individual channel matters: increasing feedback to optic flow based estimate will reduce the lag of this estimate, but also make it less contributing input. Dynamic weights in the merging and feedback allow manipulation of the importance of each individual sensory stream for the final result during the operation of the system and depending on the conditions changing due to external events as well as the robot's own actions.

Since the fusion of different inputs happens in the system as early as possible, it reduces the error at early processing stages and prevents error propagation through later stages of processing. The resulting system a) produces positional estimates that are as good as the best precision sensors it employs allow it make, b) can merge an arbitrary number of these sensory streams, and c) will continue to operate as long as at least one of these sensors is operational. Early fusion of sensory streams allows the rest of the system to be agnostic to the number and quality of sensors, which makes the system more robust and maintainable.

Correction of drift in the sensory information is not the only, and not even the main reason to use feedback in sensory processing. The main advantage the feedback can provide is the speed of processing. In the example implementation of active vision system OpenEye discussed below a visual object recognition cascade of the system may recognize a blob in a bottom left part of the visual field as a pickup truck. Motion detection sensory system may detect that it is moving to the right. The motor outflow system has full information about how the agent plans to move the camera. Given that all these processes are continuous, it automatically entails that in the next moment of time the OpenEye system knows precisely where in the visual field this truck shall be by combining feedback from object recognition with low level sensory/motor information.

This may result in the ability of OpenEye system to avoid further engagement of all the complicated cascades of the system, all the system has to do is to feed back to the early stages the expectation of what should be there and check how well it matches the input. If there is a match, then the expensive object recognition processing is not necessarily needed. If there is a mismatch, then the system engages full power to process why its prediction was wrong and how to correct it. This ability to disengage 90% of the computational capability and only concentrate on important parts of the input may outweigh the initial complexity the system. This advantage in terms of the cost of operating resources may manifest itself in wide spread applications as the energy efficiency becomes more and more important. Feedback across different modalities creates the predictive power in the intelligent system, so it can work in a predictor-corrector mode. This mode frees computational resources when correction is not needed.

The process described in the previous paragraph can be taken one step further by creating a memory map of a virtual visual field not limited by the current field of view. An example OpenEye implementation can place certain objects in the virtual field of view, turn 180 degrees, then turn back to the original view and expect to see the previously recognized objects there.

Robotic Navigational Systems

As an illustrative example of principles discussed in the previous section, this section provides a description of a robotic navigation system based on these principles.

Development of a biologically-inspired, robust, low-power, multi-component neural system able to perform self-localization and mapping will enable robots to autonomously navigate novel terrains without a global navigation satellite system (GNSS). By including the ability to learn about an environment as it explores, robotic agents will be able to autonomously negotiate novel terrains and send relevant, intelligently preprocessed information back to a human controller.

In some implementations, the system and methods described herein reduce development costs and time by allowing robots to be trained rather than explicitly programmed. The systems and method described herein can be implemented into robots, autonomous vehicles, and other moving agents for use in a plurality of applications, including: defense (e.g., Unmanned Aerial Systems (UAS) surveillance, patrol, rescue, demining); business (e.g., telepresence); home (e.g., cleaning, lawn mowing, toys); healthcare (e.g., remote diagnosis, assistive living); and agriculture (e.g., pot moving, autonomous seeding, crop assessment, wildlife conservation).

In some implementations, the navigation system and method described herein include neural systems mimicking the ability of biological organisms to navigate their environment as well as build usable and correctable representations of these environments through learning without a GNSS and active sensors.

The navigation system can navigate, map, and detect objects in land and aerial environments. Further capabilities of the system include visual learning and search, collision avoidance, a human-robot interface for robot training and deployment, and low-power hardware implementation of these algorithms.

According to one aspect of the disclosure, the system includes a path integration system that calculates optic flow, infers angular velocity from the flow field, and incorporates this velocity estimate into heading calculations. The resulting system fuses heading estimates from accelerometers, gyroscopes, engine torques, and optic flow to determine self-localization. The system also includes a motivational system that implements a reward drive, both positive and negative, into the system. In some implementations, the drives can include: a) a curiosity drive that encourages exploration of new areas, b) a resource drive that attracts the agent towards the recharging base when the battery is low, and c) a mineral reward drive that attracts the agent towards previously explored scientific targets.

In some embodiments, the system's biologically inspired navigational system includes a number of subsystems for an autonomous navigation. The subsystems can include: Path integration system for maintaining a sense of current position and direction relative to starting position and direction. Spatial representation incrementally built as the agent explores its environment. Path planning system that uses information from the spatial representation and path integration system to explore, return to base, revisit objects of interest, or avoid obstacles. Drive selection system to balance battery recharging, exploration, and return visits to explored locations of interest. Sensory system used to provide vestibular, motor, and optic flow information to drive and correct the path integration system.

The present disclosure also provides experimental results of the disclosed system in both a virtual environment and as implemented into an autonomous rover.

The navigation system can include an artificial brain model that constitutes integrated perceptual, decision-making, and motor systems. Using the navigation system, the agent can interact with its environment in an intelligent way based on its internally generated goals. The model can contain many interacting subsystems. For example, the subsystems can include a Path Integration and Neural ACquisition of Location Estimate (PInNAcLE) system. The PInNAcLE system can transform velocity data recorded from the agent's sensors and/or actuators into a world position of the agent. This world position can be used by the other modules described herein to learn positions of objects in the world. The PInNAcLE system is described in below. Another subsystem can be the MOtivation, Reward, and goal SELection (MoRSel). In some implementations, the MoRSel subsystem codes agent drives, learns maps where each drive can be satisfied through corresponding rewards, and/or selects a goal map location based on relative drive strengths. The MoRSel system is described below. Yet another subsystem can include the Spatial Planning and Allocentric Representation of Knowledge (SPARK) system.

The SPARK subsystem can plan a path and provide a goal heading direction based on the current location, goal location, and/or the locations of learned obstacles. The SPARK system overview is given below.

Path INtegration and Neural ACquisition of Location Estimate (PInNAcLE)

The navigation system's PInNAcLE subsystem follow the biological path integration system outlined in FIG. 4 and can be based on joint information from a number of sources. The PInNAcLE system can include input from motor commands producing self-motion of the agent, input from vestibular or inertial sensors (e.g., accelerometers and gyroscopes), and optic or other sensory flow fields (e.g., from video cameras or sonar sensors). The PInNAcLE system can maintain the agent's sense of location within the environment. The motor output commands can add the ability to anticipate movement before the agent performs the movement, and optic flow can add precision to the estimates of angular velocity especially important for low-velocity rotations as described in above. Detailed description of the optic flow computation used to generate result presented here is provided below.

Figure 20:
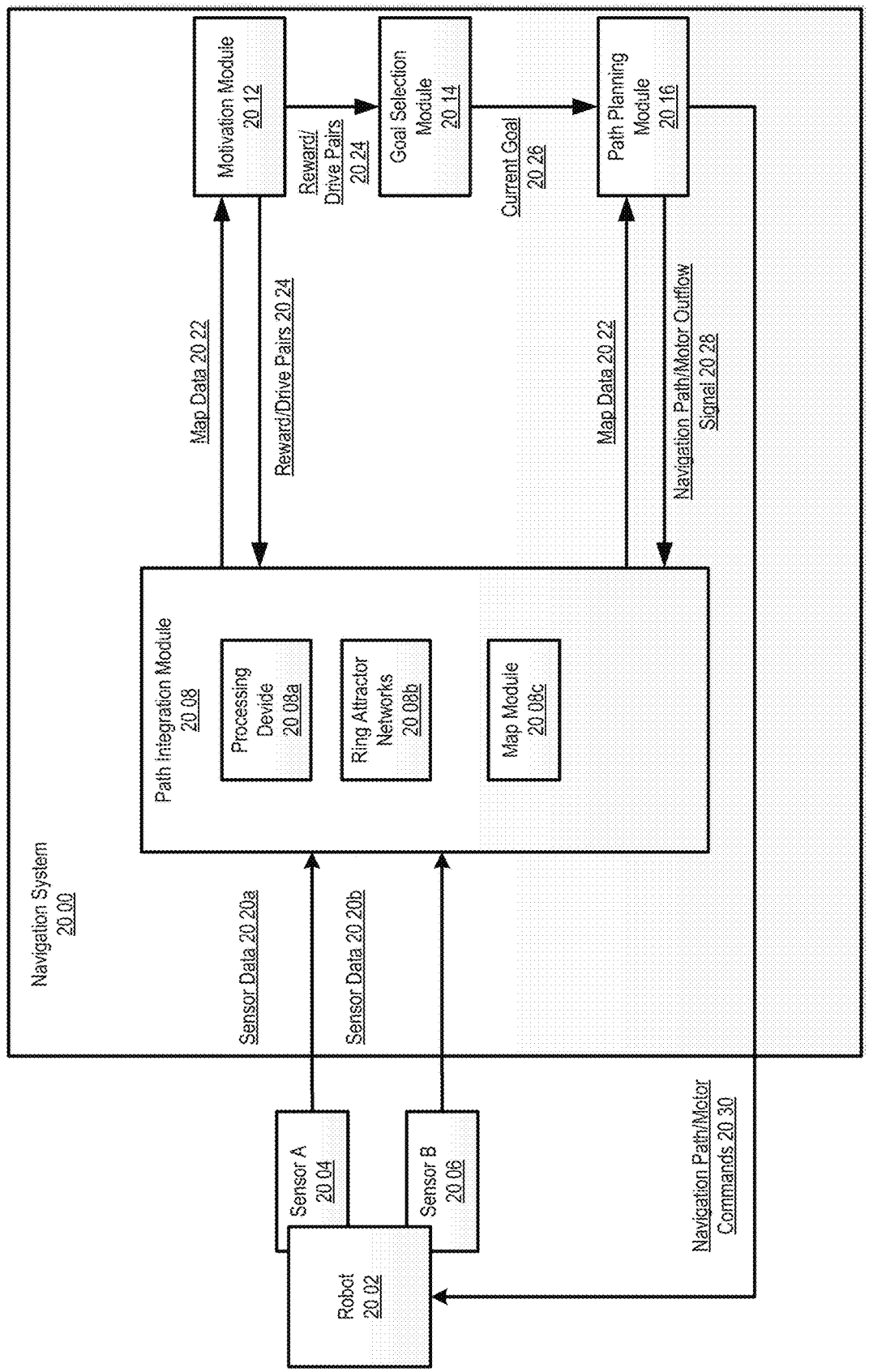
FIG. 20 shows an exemplary navigation system architecture.

In some implementations (e.g., FIG. 20), a navigation system 2000 may be able to connect to a robot 2002 in order to provide guidance 2030 on where to travel within an environment. For example, the robot may have at least sensors A 2004 and B 2006, which each may correspond to a plurality of types of sensor data 2020a and 2020b. In some implementations, sensor types may include IMU sensors, motor outflow sensors, and optic flow sensors.

The robot may send the sensor data to the path integration module 2008, which may include a processing device 2008a (e.g., a processor and/or other computing device), ring attractor networks 2008b, and a map module 2008c. In some implementations there may be four ring attractor networks for IMU sensors, four ring attractor networks for optic flow sensors, and four ring attractor networks for motor outflow sensors. In some implementations there may be one ring attractor network per sensor for determining a heading, and one ring attractor network per sensor per spatial scale for linear displacement. The processing device may be able to process the sensor data from the sensors by weighting the sensor data (e.g., in relation to other sensor data) processed by the corresponding ring attractor network, and by combining the sensor data. The combined data may then be used to generate environment data (e.g. information about the robot's current position in its environment and/or other data related to the environment). The map module may use the environment data to generate a plurality of maps related to different data (e.g., different maps may be generated for different goals, different types of sensor data, and/or the like. In some implementations, the map module may be separate from the path integration system.

The path integration module may interact with a motivation module 2012, a goal selection module 2014, and a path planning module 2016 in order to generate those goals and/or to generate other data. For example, the path integration module may provide the map data 2022 to the motivation module so that the motivation module can determine reward/drive pairs 2024 to provide to the goal selection module for the robot. The reward/drive pairs may be determined by examining maps and determine potential reward items in the environment and codes and/or values to relate to those reward items. The goal selection module then may weigh the reward/drive pairs against one another to determine at least one pair to prioritize. The prioritized pair may be become a goal 2026 which may be sent to the path planning module. The path integration module may send the map data to the path planning module, in order to use the map data and the system's spatial understanding of the environment, and to use the goal criteria in relation to the environment, in order to generate a path 2028 from the current position of the robot to the robot's goal. The path planning module may forward this path to the robot in order to allow the robot to understand where to travel next 2030 and to path integration module as motor outflow signal to be integrated as expected path 2028.

Both path planning and path integration modules can utilize the same internal spatial representation system that follows the principles outlined in above and holds several specific 2D maps in it. A human readable map can be constructed by blending the goal selection maps activated by each drive (drives can be color coded to mark the corresponding reward type) and an obstacle map. The resolution of the map can depend on the spatial scales of grid cells in the PInNAcLE subsystem and can be adjusted according to the user's requirements.

MOtivation, Reward, and Goal SELection (MoRSel)

The MoRSel (Motivation, Reward, and goal SELection) subsystem is an extensible internal motivation framework that can allow for the definition of an arbitrary variety of agent rewards. Each type of reward can be matched with a corresponding drive that, in some implementations, can be calculated as a function of the agent's internal state. These drives can be analog values that may be modulated or explicitly set by an end-user. When the agent navigates to a location that contains a combination of rewards, it can learn the global position of those rewards by increasing the value of synaptic weights between the corresponding drives and the place cell that codes for the agent's current location. Mapping reward values to drive weights may allow the agent, upon the growth a particular drive, to reconstruct an allocentric reward map in order to return to a reward location even after it has traveled away from that position.

The MoRSel subsystem can contain reward-drive pairs. In some implementations, the subsystem contains three reward-drive pairs, where each drive or reward signal can range from 0 to 1. The MoRSel subsystem can switch between navigation goals based on the value of drives and learned potential rewards. Exemplary reward-drive pairs can include: 1. A resource drive that monitors the internal battery level and/or similar depletable resources. For example, as the battery drains, the drive to find a source of replenishment increases. 2. A mineral drive that is a drive to a target of interest. For example, the mineral drive can be satisfied when the agent is in proximity to a target rock that has a reward value. In some implementations, the reward value is designating as a scientific or other interest attached to it for example rocks on Martian surface that can potentially contain water. 3. A curiosity drive that can be a drive to explore an environment. In some implementations, there may be no explicit rewards that have been placed in the environment, but the curiosity drive is instead remembers all previously visited positions in its internal environment map and drives the agent to unexplored locations. This drive can decay once the agent's environment has been fully explored.

The navigation system can learn the positions of rewards and obstacles by navigating to those locations and making memories that record the presence or absence of motivationally (i.e., reward/deterrent) stimuli. These memories may be stored as synaptic weights between the drives described above, and global position coded by the Path Integration (PInNAcLE) system. These weights can be updated for example using simple associative learning rules, temporal difference reinforcement rules or Q-learning method.

In some implementations, the navigation system can treat obstacles and rewards differently (i.e., each has a separate map and/or a different learning rule). A separate map may be used because obstacles restrict path planning through the inhibition of the bidirectional search described below. Obstacle weights can decrease when the agent is located at that position, but the weight can increase when the agent is at a nearby location and simultaneously sensing an object in the direction that would lead to the weight's coded location. The process of transforming a local proximity or touch signal into a world position is described further below.

The goal selection system may balance the strengths of one or more drives with the agent's confidence of the availability of rewards at different environment locations in order to choose where to navigate to substantially satisfy its currently active drives. Before selecting a location as a goal, the system may mask locations that would either place the agent at the position of an obstacle or out of the range of positions that the agent can represent. In some embodiments the presence of an obstacle attracts the mask value towards 0, and may keep it from being selectable as a goal location. In some embodiments, the mask value slowly recovers if the obstacle weight shrinks due to evidence that the location is navigable. In order to keep the agent from leaving the area representable by the PInNAcLE system, the positional areas of the mask may be silenced so that they may not be selected as potential goal locations.

After the candidates for the goal are selected, a new goal position may be chosen through a competitive process, for example a winner-take-all function. Once this winner is selected it is held in memory either until a reset signal occurs or until the location is reached by the agent. If the reset signal happens before the goal is reached, the whole process of goal selection repeats and a new goal (potentially different from the old one) is selected.

Spatial Planning and Allocentric Representation of Knowledge

The Spatial Planning and Allocentric Representation of Knowledge (SPARK) system may translate agent senses and actions between egocentric and allocentric coordinates in order to control agent exploratory behavior. On one hand, SPARK transforms the agent's current allocentric position from the PInNAcLE system (above) and the goal location selected by MoRSel into a substantially optimal heading for quickly and successfully reaching the goal location and also driving the agent motors. On the other hand, the touch and proximity senses provide local egocentric information as to the proximal location of obstacles, which SPARK transforms into an allocentric spatial position to be learned as an obstacle position by MoRSel.

Allocentric Representation of Knowledge

The allocentric spatial representation in the system may model neural representations found in the mammalian brain. Place cells produced by the PInNAcLE system (above) may provide a 2D Cartesian coordinate of the agent on the surface, and head direction cells provide the heading. Both systems may use similar representations as a bump of activity in the neural field that is centered on a corresponding position or direction as discussed in above; the difference being that the positional map is 2D and the directional map is wrapped-around in 1D. The positional signal is may be used for goal and obstacle mappings, and the directional signal may be used in coordinate transformations between egocentric and allocentric representation for obstacle mapping and motor command calculation. Both systems may maintain their relative position and heading with respect to initial position and heading; anchoring these systems to absolute coordinates.

When the agent registers contact with an obstacle, SPARK translates this information into an allocentric world location of the obstacle that is learned as un-navigable when planning future routes through the environment. The obstacle's heading, compared to the agent, is rotated according to the agent's internal heading in the PInNAcLE system to give an allocentric direction of the obstacle relative to the agent. The position of the agent, represented by an active place cell in the agent's PInNAcLE system, may be used to increase the obstacle weight for an adjacent place cell that represents the position where the obstacle lies according to the allocentric direction calculated above. In this way the proximal obstacle may be learned on an allocentric obstacle map.

A chain of neural populations may also do the inverse conversion of allocentric to egocentric coordinates in order to provide motor commands. An example system may convert the desired destination coordinate into the rotational velocity motor command, which then controls navigation for the agent. The position-to-direction map serves as the first stage of the transformation from desired location to motor command, and converts the allocentric position of the desired destination into an allocentric desired direction of movement by comparing the desired position with the current position of the animat. A desired direction ring compresses representation of the position-to-direction map into a one-dimensional allocentric desired direction vector. The direction-to-turn map then compares the allocentric desired direction with the allocentric current head direction and computes the egocentric turn force vector. To drive the vehicle, this signal can be interpreted as steering angle for the left or right turn.

Spatial Planning

SPARK's spatial planning algorithm may be based on a neuronal parallel breadthfirst asymmetric bidirectional graph search where each location in the path planning system corresponds to a node in a graph. Edges in the graph may initially exist between neighboring locations, but as the agent explores the environment and encounters obstacles the corresponding edges may become impassable through obstacle learning and may be excluded from the breadth-first probing. This may result in a system that can adapt to found configurations of obstacles and find the substantially shortest path around these obstacles.

Figure 7:
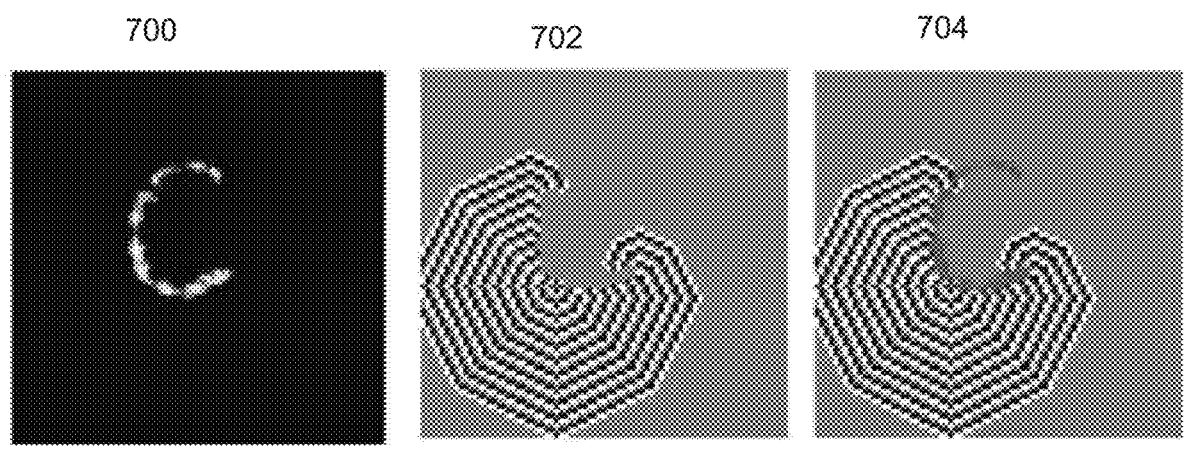
FIG. 7 shows obstacle map generated by the navigation model presented herein and how it affects path planning search algorithm.

In general, the SPARK algorithm may model propagation of waves of activity from the goal location (reverse activity spread). In an unconstrained environment these wavefronts may form expanding concentric circles around the goal location. Wave propagation may not be allowed if an obstacle is encountered, so the wavefront deviates from the circle to flow around the obstacle as shown in FIG. 7 by depicting obstacle map 700, wave propagation 702, and a combined view of both populations 704. As a result of all deviations, the first wavefront segments that reaches the current location of the agent comes from the direction that corresponds to the substantially shortest path to the goal. In response to this, a new wavefront is initiated at the current location (forward activity spread). The collision of this front with the second wave coming from the goal may then happen at the location closest to the current location of the agent and in the direction of the shortest path towards the goal. This is called the next desired destination. Then the agent moves to this desired location and the process is repeated. A reset signal may be generated when the graph search finishes, which allows a new goal to potentially be selected as described above.

Robotic Implementation

The above described navigation system may be implemented into a robotic system, autonomous agent, or other moving body. This section describes one exemplary implementation of the navigation system into an example robotic system.

The navigation system can be implemented into any microprocessor. In this exemplary implementation, the navigation system was implemented with Lego Mindstorms NXTs outfitted with 7 sensors and 4 motors. A Lego NXT is a microcontroller that can be interfaced with many different types of sensors and motors, all which require no soldering or significant setup time. The NXTs communicate with a low-power, low-cost single-board computer development platform (Pandaboard) which controls communications with a neural application client. The Pandaboard runs an asynchronous server that listens for commands from the neural application client while reading data from the NXTs and camera. When data is received from an NXT, it is repackaged and sent over UDP to the neural application client. The Pandaboard utilizes OpenCV to process image data from a USB camera and preprocesses/broadcasts it to neural application over TCP through an onboard router connected to the board through a Cat5e cable. The neural application client is capable of sending movement commands and can also schedule tasks on the NXTs.

Figure 8:
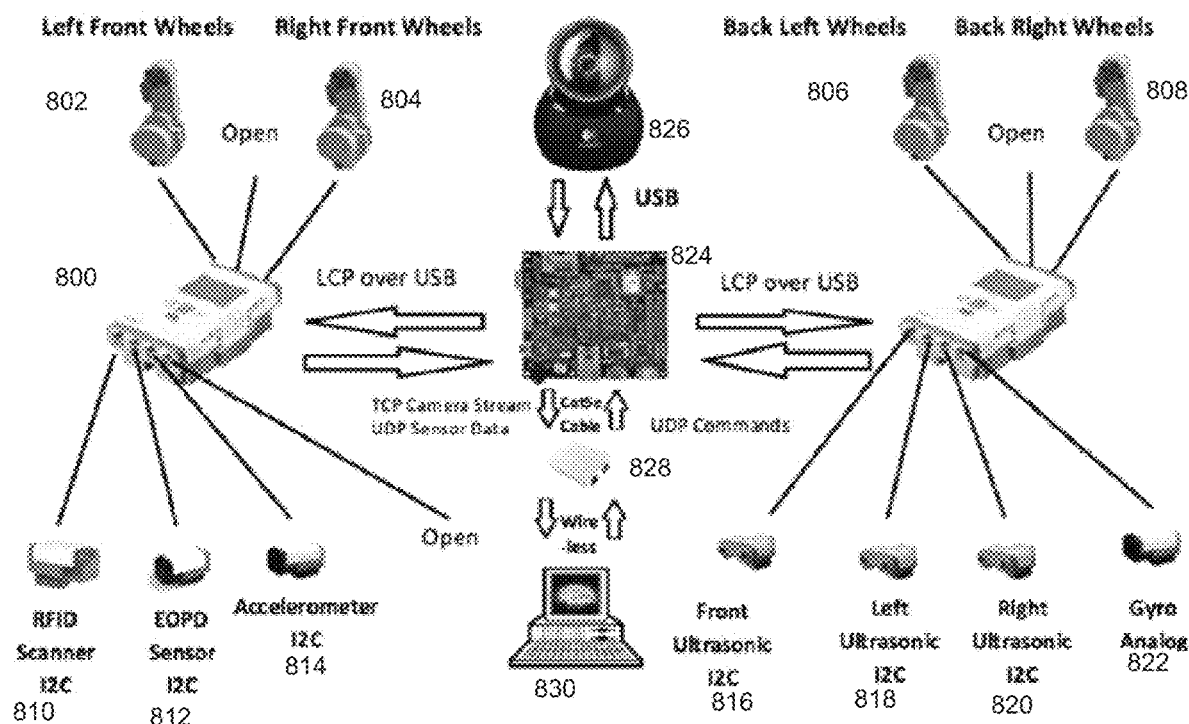
FIG. 8 shows assembly diagram of robotic sensors used in the example embodiment

FIG. 8 shows a hardware diagram and the protocols used to connect the devices. In some implementations, a Lego Mindstorm Robot 800 may have left-front wheels 802, right-front wheels 804, back-left wheels 806, and back-right wheels 808. The robot may have sensors such as an RFID scanner 810, an EOPD sensor 812, an accelerometer 814, a front ultrasonic 816, a left ultrasonic 818, a right ultrasonic 820, and a gyroscope analog sensor 822. The sensors on the robot may be configured to communicate with a Pandaboard 824 configured with LCP over USB connectivity. The board may also support a webcam 826 and/or other camera and/or image-capturing device, as well as a communication device 828 configured to allow communications between the robot and another electronic device (e.g., a computer 830).

Figure 9:
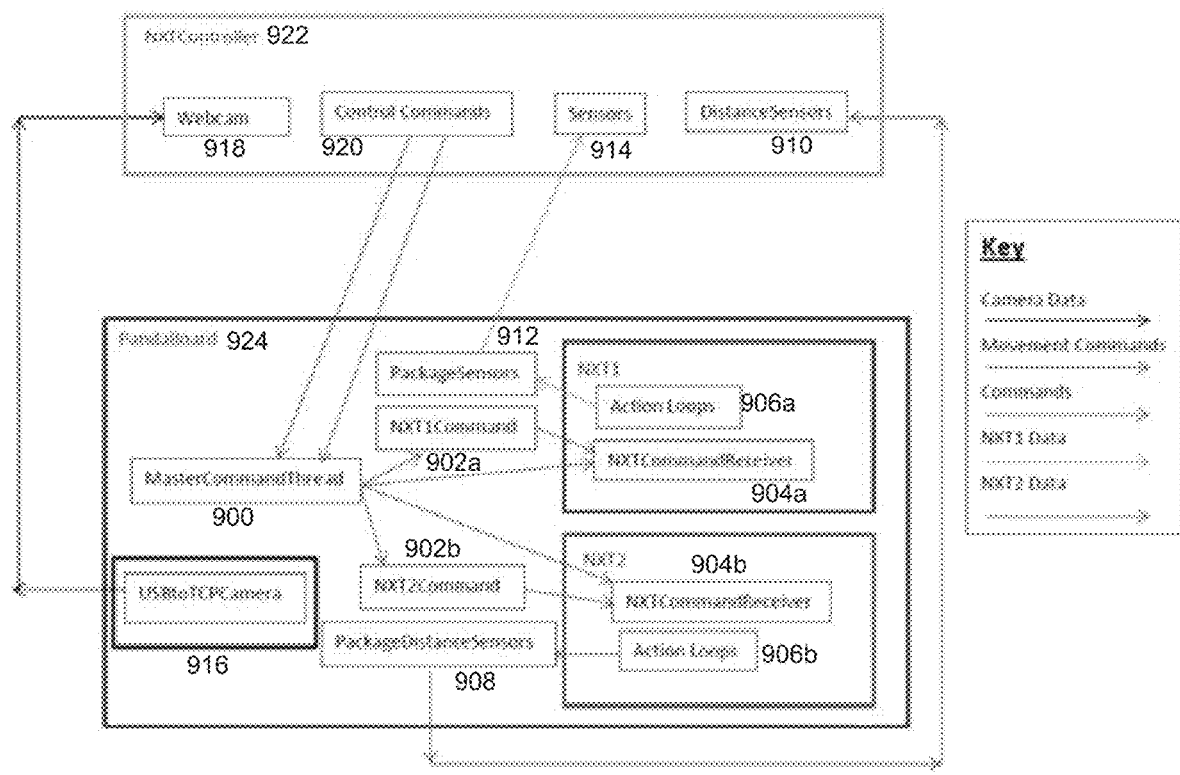
FIG. 9 shows software components of example robotic embodiment.

FIG. 9 illustrates the main objects within the software of the system and their respective hardware hosts and communication streams. In some implementations, a PandaBoard 924 may be configured with a MasterCommandThread 900 which may send NXT Commands 902a and 902b to a Lego Mindstorm board configured with an NXTCommandReceiver 904a and 904b which may receive instructions and/or other data from the PandaBoard. Each robot may also be configured to support action loops 906a and 906b, which may include actions such as PackageSensors 912 (which in some implementations may be configured to interact with sensors 914 on the NXTController 922), and/or PackageDistanceSensors 908 (which may be configured to interact with DistanceSensors 910 on the NXTController). The PandaBoard may also be configured with an USBtoTCPCamera module 916 which may allow the PandaBoard to receive data from a webcam 918 and/or a similar image-capturing device and convert it into a stream over TCP protocol. The NXTController may also periodically send control commands 920 to the PandaBoard when necessary.

The robot was equipped with three ultrasonic sensors that detect objects in proximity. These readings are then used by the navigation system to form an obstacle map to avoid collisions. These sensors were placed on the right, left, and front of the robot. An accelerometer and gyroscope were used to detect the robots acceleration and angular momentum for use with the PInNAcLE subsystem. RFID tags and an RFID scanner emulated the more complex chemical scanners used in Mars Rovers. The RFID tags were placed around particular rocks, with each emitter tuned to a particular frequency. When a tag was detected, the RFID signal simulated a chemical detection of various aspects of rock geology (e.g., a particular chemical signature). The model reward system was then triggered and the rock was placed in the robot's internal map of the environment. These tags are also used by the robot to simulate recognition of the recharging base.

The robot experiments were conducted in a ~2×2 meters indoor simulation of the Martian landscape. This indoor facility provided a scaled-down, enclosed area with rocks and small terrain variation (the terrain is a tarp sheet with small elevation discontinuities) to test vision and navigation aspects of the navigation system.

Model Performance

The robot was tasked to explore the experimental environment; tracking its past and present position through the intelligent integration of self-velocity parameters given by inertial, motor, and a visual flow sense, learning the position of task-relevant objects such as a home base, scientific targets, and obstacles; and managing competing drives for exploration and management of internal resources such as its battery level. The structure and physics of the virtual Mars environment were created and simulated with the JMonkey game engine, passed to the model using Virt-U package, and the neuromorphic algorithm controlling the virtual rover was simulated separately after having been written in the Cog Ex Machina simulator or INDRA simulator (results not shown).

Figure 10:
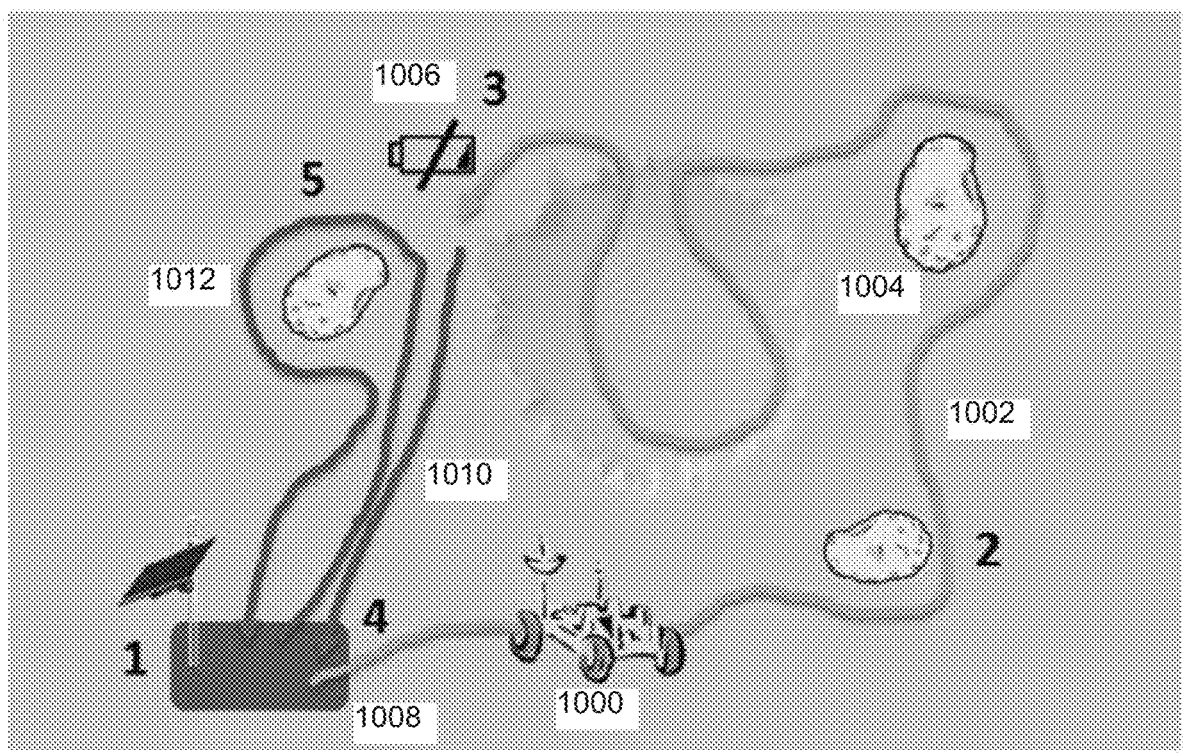
FIG. 10 shows an experimental paradigm used to test the navigation model presented herein.
Figure 11:
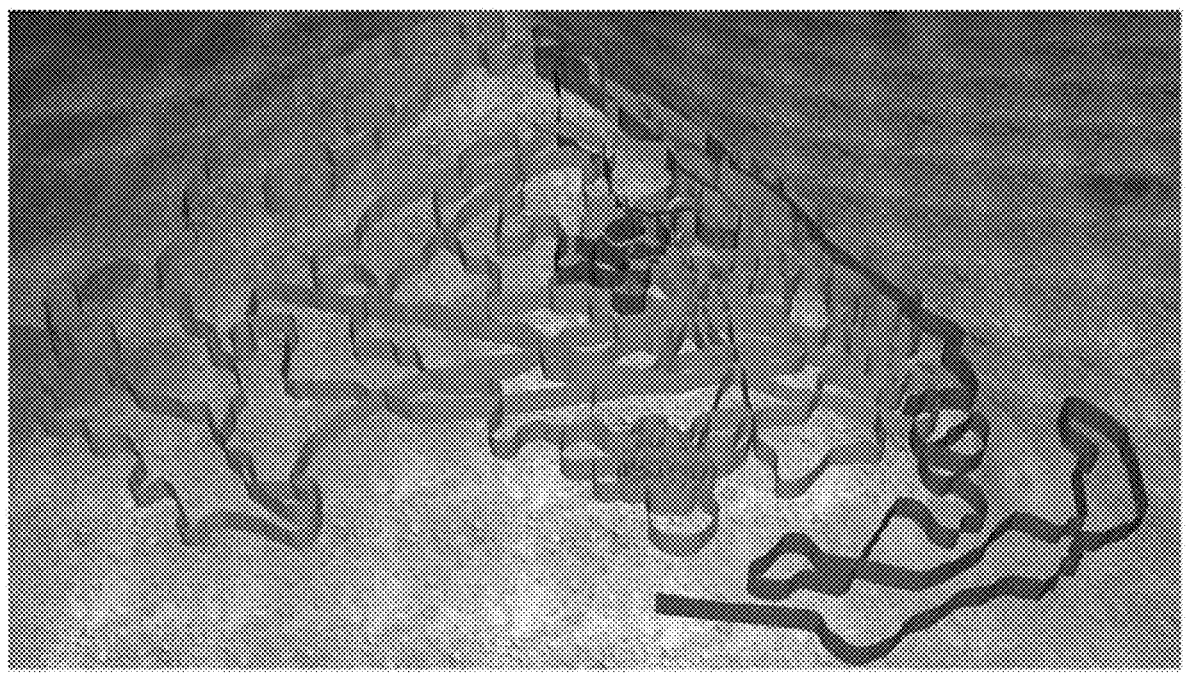
FIG. 11 shows an example trajectory of a simulated robot in a virtual environment.
Figure 12:
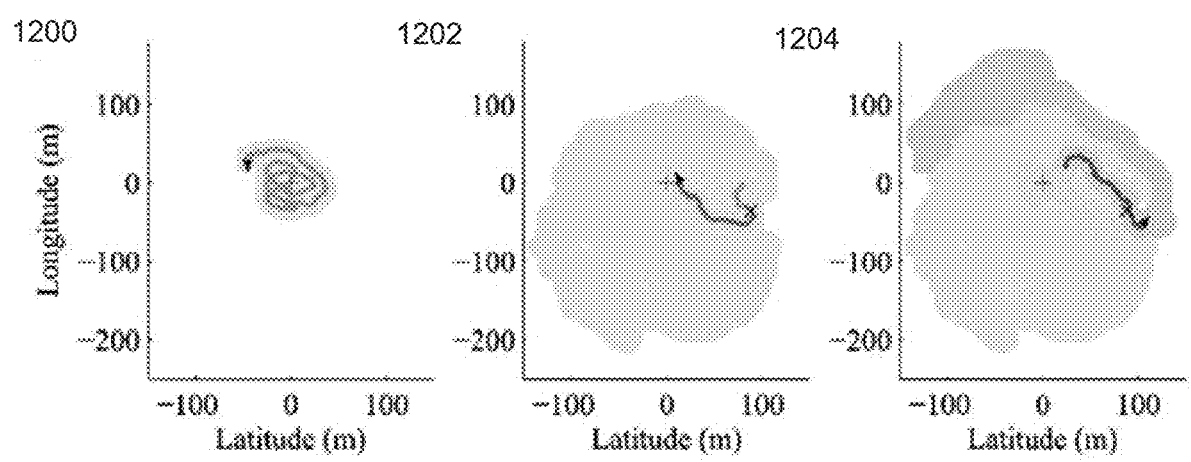
FIG. 12 shows a map view of a trajectory from FIG. 11 as it builds incrementally through time.

FIG. 10 diagrams the specific phases of the main task. The virtual rover 1000 begins its exploration by leaving its base with full battery in order to begin exploring. (FIG. 10, 1002). The rover explores unknown areas, maintaining its relative position and orientation with respect to the starting point and progressively building and updating its spatial representation of the environment mapping the obstacles 1004. This map is useful when the rover will, for instance, seek specific objects and locations in the environment or as a source for conversion into human readable format. After exploring for some time the rover's battery depletes 1006 to the point where it becomes motivated to return to the base 1008 where it began exploring by as direct of a route as possible (FIG. 10, 1010). After recharging its battery the rover continues to explore from where it left off (FIG. 10,1012). FIG. 11 show the actual results in the virtual environment, and FIG. 12 shows an incremental map view of the same trajectory (e.g., 1200 corresponds to path 1002, 1202 corresponds to path 1010, and 1204 corresponds to path 1012).

FIG. 5 compares the compass heading of the physical rover through the simulation to heading determined by the integration of velocity information from one of several senses. Note that the final head direction estimate is determined by the integration of a combined estimate from all three senses as outlined above.

Figure 13:
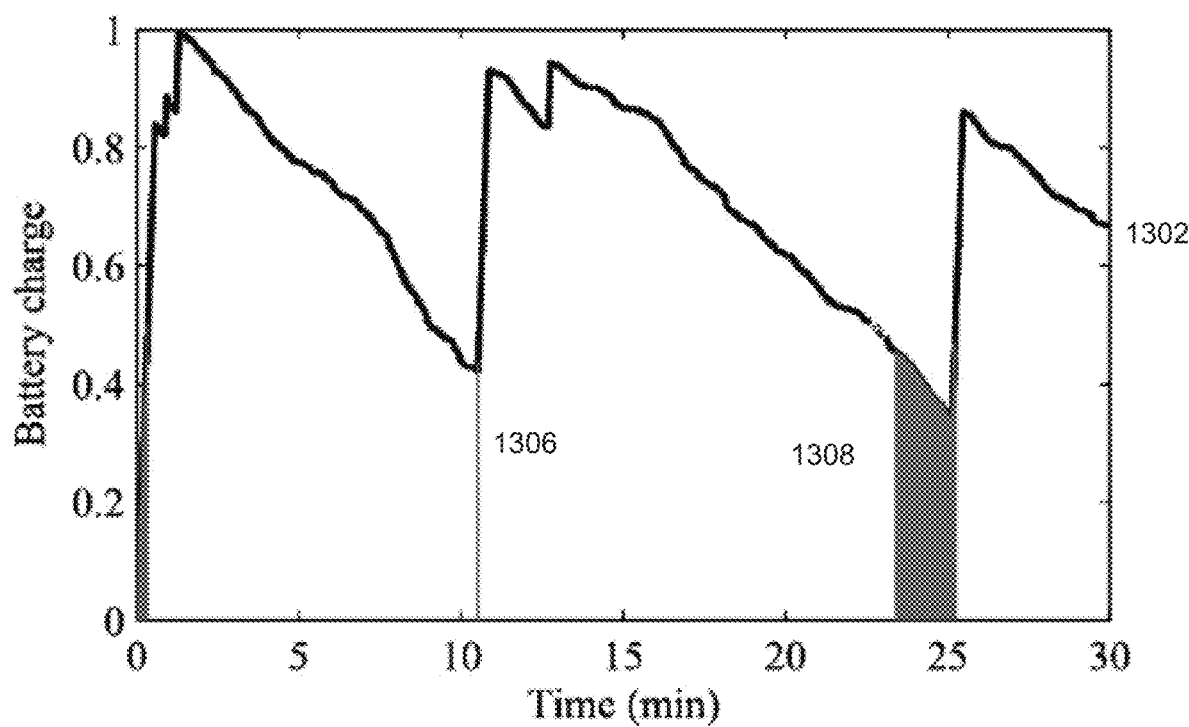
FIG. 13 plots a battery level during the exploration experiment.

Autonomous exploration may include the management of multiple, overlapping, and oftentimes conflicting drives that keep the agent relatively safe and efficiently completing its task(s). The simulation requires the rover to balance its exploratory drive with a need to keep its battery charged; the balancing of goals by the navigation above. FIG. 13 plots the rover's battery level over the course of the simulation 1302. The battery is empty at the beginning of the simulation 1304 in order to motivate the rover to learn the position of the charging base. Gating the learning of a reward by the desire for that reward may be a biologically realistic method of conserving memory and computational resources while retaining survival-relevant memories. When the battery is low enough, the rover revisits its base in order to recharge, as shown by the shaded areas 1306 and 1308 in FIG. 13. The rover takes longer to find the base on the second visit at minute twenty-three, both because the rover has traveled further from the base and because accumulated path integration error forces the rover to search in the immediate vicinity around its memorized position of the base. In both cases, however, the rover is able to find the charging base, recharge, and continue its exploration; the second decision to recharge is also shown in FIG. 12 as the part of the trajectory stretching from about 0 m latitude to about 100 m latitude in the middle graph.

Figure 14:
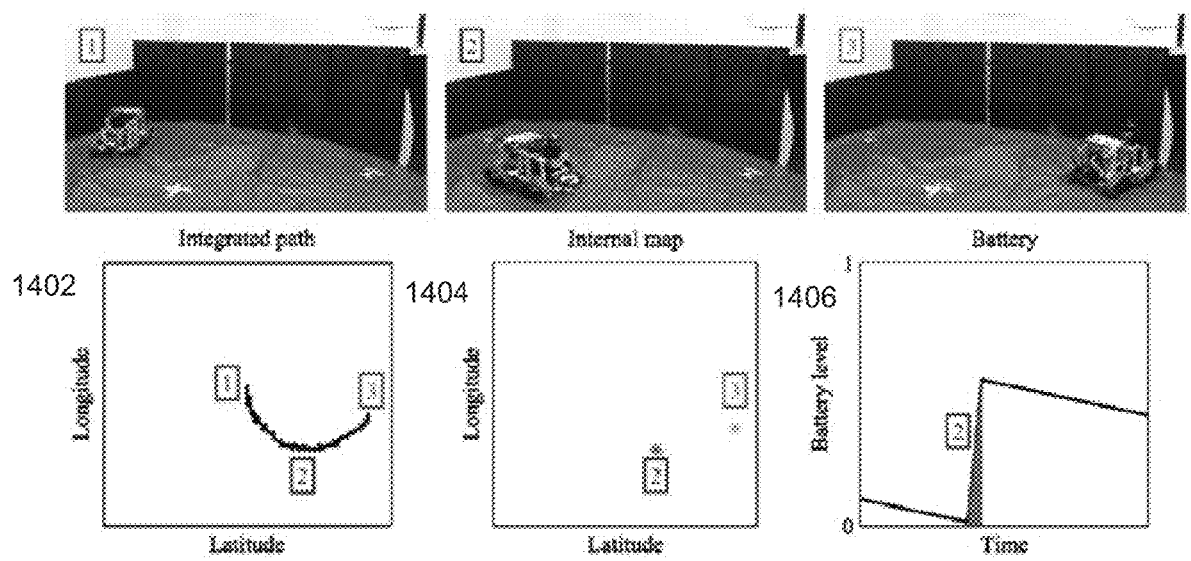
FIG. 14 shows results of a model test in a robotic setup described herein.

In addition to testing the performance of the navigation system in the virtual environment, the model was also demonstrated to operate on a physical robot. The construction of the robot and environment is detailed above. FIG. 14 shows a short simulation of the robot moving in a preset circular arc. While traveling in this arc the robot moves over radio emitters that symbolize the charging base and a scientific target. In this simulation the navigation system's path integration (PInNAcLE) subsystem is driven exclusively by the motor system's preset velocity, sent as individual tread torque levels. The robotic platform is able to map out its course in the environment 1402, learn the positions of the same types of task-relevant objects as in the virtual environment 1404, and is able to recharge a simulated battery when moving over the charging base 1406.

The robot was also turned in place by setting the angular velocity to the sine of the simulation time scaled so that it reverses its direction of rotation around the vertical axis every twenty seconds. This preliminary test shows that the camera on the physical robot is able to accurately determine the robot's angular velocity at slow rotation speeds. In some implementations, increasing the camera's frame rate can increase at which speeds the navigation system can detect rotations. In some implementations, detection of rotation can be improved by smoothing the motion of the camera by adding a suspension system to the robot or by gating optic flow's influence on path integration by the other senses' estimates of rotation speed as disclosed above.

OpenEye: An Artificial Visual System Based on Neural Principles

The OpenEye model is an active vision system that autonomously make decisions about where to look, generates saccades to target locations, and learn online view-invariant representations of salient objects. OpenEye models the parallel visual processing streams of mammalian visual cortex, and integrates in a single framework several capabilities that are typically modeled separately, such as the influence of bottom-up saliency and top-down spatial evidence on saccade decision-making, view-based object recognition, stable incremental learning, and space-variant approaches to vision modeling In some implementations, the OpenEye and navigation system learns incrementally with a single presentation of the stimulus 1506, for example, it does not require a separate training and testing phase. OpenEye may also be able to operate with or without supervision.

Figure 15:
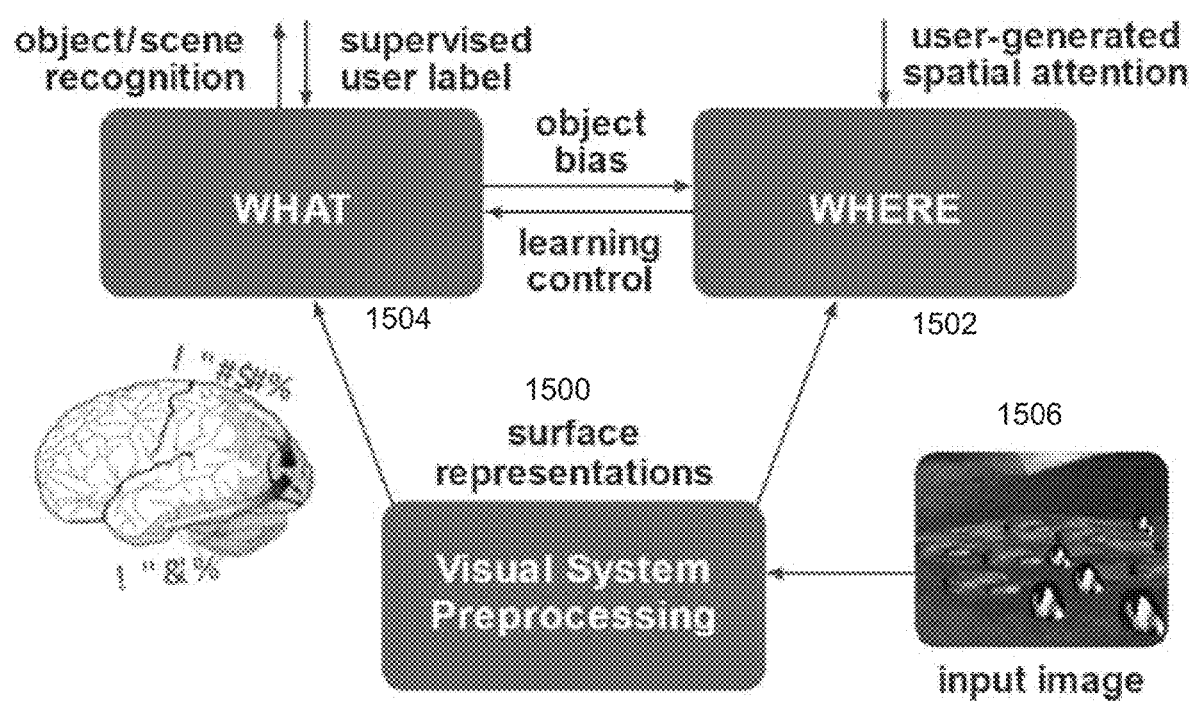
FIG. 15 provides an overview of processing streams in a mammalian visual system.

In some implementations, OpenEye integrates bidirectional connections 1500 between dorsal (where) 1502 and ventral (what) visual processing streams 1504 (e.g., see FIG. 15). OpenEye's where pathway may use simulated eye movements to navigate through a map of candidate areas established by bottom-up surface properties and top-down spatial evidence in order to explore distinct views of each object. By using a log-polar representation of the retinal visual field, OpenEye may sample the image "view" generated by each saccade in a space-variant manner such that an object in the center of the system's visual field (the fovea) is represented in high resolution while objects in the periphery are represented with nonlinearly decreasing resolution. This may save a processing power, as, for example, an image field of view can be processed in an order of magnitude smaller neural population using the log-polar compression.

Once the where pathway has chosen a point of foveation, it forms a surface-fitting attentional shroud around the object in order to isolate it from other surrounding objects. This is implemented using feedback principle outlined above. The attentional shroud may provide OpenEye with the capability to discover whether sequential views belong to the same or to different objects. The what pathway may be modeled as a series of hierarchical classifiers that cluster objects into view, object, and/or name categories. After the what pathway has identified an object, the what-to-where feedback may use learned prototypical object-feature maps to produce "smart saccades" in order to focus on spatial locations that yield greatest disambiguation of competing object identity.

Figure 16:
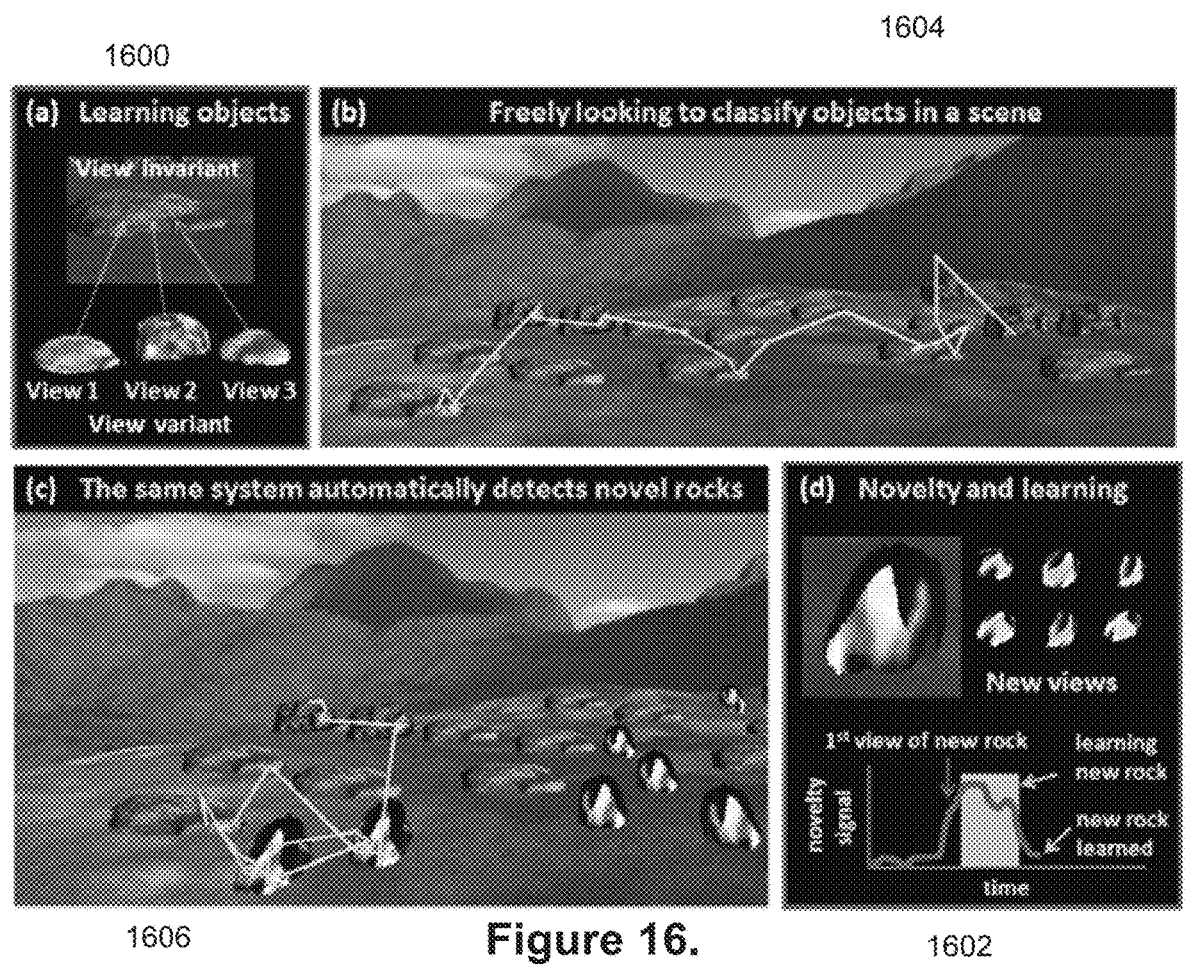
FIG. 16 illustrates the result of OpenEye model recognizing rock types in a virtual environment

The Martian Virtual Environment used to train OpenEye was created using the jMonkey 3 graphical engine and interfaced with the neural model using Virt_U package. OpenEye was trained to recognize two types of Martian rocks (type 1 1600 and type 2 1602) in FIG. 16 with a supervising name signal for 250 cycles. The scene is then switched to a similar scenario, but this time, there was no supervision, and there was a third, novel type of rock that the system has not been trained on. The accuracy of classification in this testing scene is close to 100%. At first, the system is not able to recognize the novel rocks, and there is no name associated with the newly created object. This triggers a novelty signal in OpenEye, which can be returned to the user as an alert, or be utilized to capture snapshots of the novel rock for closer examination. This capability allows the system to generate alerts and capture views 1604 not only of known science targets, but also novel targets 1606 of potential interest to the scientist. Eventually, once OpenEye has learned several views of these novel objects, it is able to classify them properly upon subsequent foveation, and the rock becomes part of the "object dictionary" of OpenEye, where a user can choose to attach a verbal label to the rock.

Virt-U: Apparatus and Methods to Connect Off-the-Shelf 3D Engines or Physical Robots with Neural Simulation Software Packages.

The system disclosed herein includes a virtual universe (Virt-U) software component 1700 designed to simplify prototyping of neural models of robotic intelligence and test them in a virtual environment before implementing on physical robotic platform. With Virt-U a user can connect an existing neural modeling software package with another existing 3D simulation engine, for example a game engine.

Figure 17:
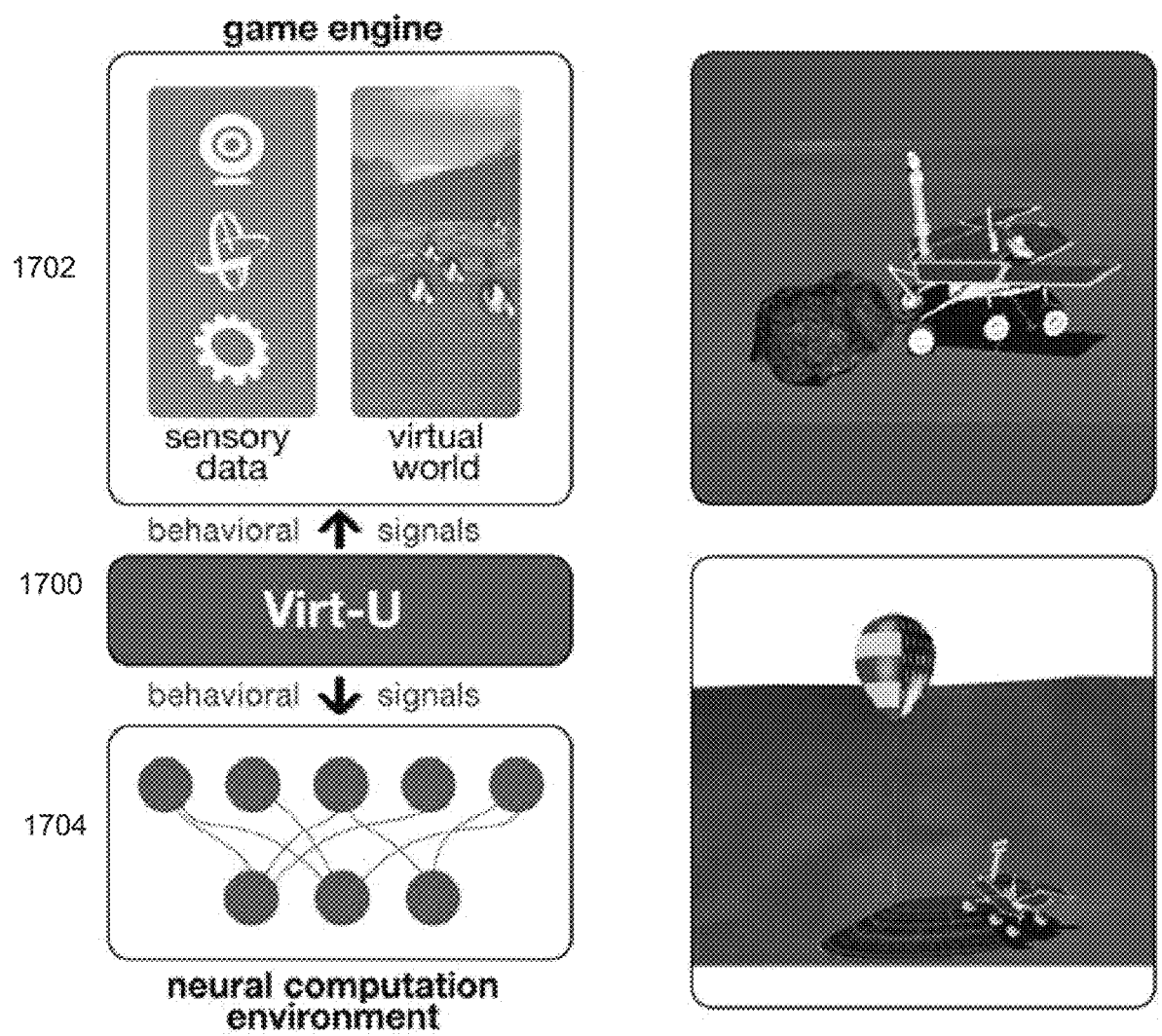
FIG. 17 depicts Virt-U interface between neural computation and 3D virtual engine.

In this scheme virtual environments 1702 supply rich sensory and proprioceptive signals attached to an agent, while the neural model 1704 (also referred to as the brain) receives and processes sensory data to produce motor control commands required to elicit the agent's corresponding behavior (e.g., see FIG. 17).

The example system binds to a neural engine of choice that may allow for neural models to be executed in a substantially parallelized, distributed computation environment possibly on one or more interconnected computer systems with GPUs. In two example instantiations we connected Virt U to Cog Ex Machina software from Hewlett Packard, and to INDRA engine developed by Neurala Inc. Virt-U then delivers sensory data to the neural model and behavioral commands (translated to physics and graphics) to the 3D engine. The same API that Virt-U exposes to neural engine for connectivity with the virtual environment is used to connect neural engine with the robotic platform.

Virt-U Architectural Principles

Virt-U architectural principles abstract the interface that connects a virtual world or robotic platform with its neural modeling environment. In order to segregate dependencies of the neural modeling environment from those of the virtual environment engine the Virt-U architecture includes of two major layers: the VE layer and the proxy layer. The VE layer abstracts the virtual environment engine and ads functionality that for example allows extracting sensory information that is not usually available from the game engine. The proxy layer delivers this sensory information to the neural model and extracts neural information from the neural model in order to perform the behavior. The Virt-U can have two modes, particularly: 1. Simulation—when the behavior of the animat is controlled by the brain, and 2. No-brainer—no brain is attached, used for testing virtual environments.

Virt-U considers the world to be populated by virtual objects. These virtual objects can be animated (brained) and non-animated (brainless). Brained objects, called animats, can be controlled by neural model. An animat's brains receives sensory (e.g., visual) and/or proprioceptive signals and can then exhibit a behavior that follows the laws of physics to a predefined level. Animats can be either virtual animals (e.g., a rat) or vehicles (e.g., a rover), depending on how their motor functions are controlled, but a brain in both cases controls behavior. Brainless objects, called items, are entirely controlled by the virtual environment and obey its physics. Items include rocks, buildings, trees, etc. and can be considered a source for sensory information including rewards sensed by animats.

Virt-U considers an animat to be a collection of sensory organs and animat controls. Sensory organs may in turn include sub-sensory organs, which ultimately can be connected with virtual sensors dedicated to collecting sensory information. For example, an animat may have a sensory organ called "eyes" that comprises individual eyes, where each eye contains facets connected with virtual cameras. All sensory organs are responsible for maintaining and updating sensory information for the sub-organs they contain thus allowing for recursive sensory data update to be performed on an animat. Animat controls constitute outgoing interfaces that may be accessed by the brain to perform the predetermined behavior. Sensory organs and animat controls expose incoming and outgoing interfaces to be accessed from the Virt-U proxy layer in order to supply and deliver sensory and motor control information.

On the neural modeling side (brain side), proxy organ controllers perform access to the VE. These controller can retrieve and supply neural data by accessing a specific organ controllers' incoming and outgoing interfaces. Proxy controllers can abstract internal knowledge of sensory organs from the neural model by acting as hardware drivers within the neural modeling environment. In simulation mode, Virt-U can create the virtual world based on an XML description. This description is sufficient to define the world, the animats with all their sensory organs and controls, and all virtual objects with their associated rewards. This XML-based virtual world description ensures Virt-U portability between various neural modeling environments.

Virt-U VE Layer for JMonkey Game Engine

An example implementation of the Virt-U VE layer presented here complements the open source JMonkey game engine.

Virt-U Application and Library

The Virt-U library platform may be a general-purpose, Java-based game development environment that extends 3D graphics game development capabilities to the Java programming community. The Virt-U may include a system that maintains a variety of assets, for example, models, textures, sounds, whole scenes, rendering of 3D graphics, and the ability to simulate physical interactions.

The Virt-U library layer may isolate the development of a brain-controlled animat from the specifics and complexity related to 3D game programming. On the user level, a user may create and run a virtual world populated by an animat by writing Java code, instantiating the classes representing the world and the preexisting animat, and adding external cameras to the world as necessary. In some implementations, once the classes are instantiated, the VE is run by the JMonkey game engine and can be controlled via the JMonkey GUI.

In some implementations, Virt-U application is a platform application that builds custom virtual worlds at runtime, which extends the DebugWorld class and implements the WorldBuilder interface comprising a single construct method. Virt-U application is embodied in DebugApplication—an executable intended for testing custom virtual environments in the no-brainer mode and generation of world XML-based description to be used in simulation mode.

As a command line argument, Virt-U application might take a name of a custom class that extends DebugWorld. An example of such a class is presented below.

Once the construct method yields, the debug application runs under control of the physics engine and can be interacted with via JMonkey GUI, which interprets keyboard and mouse actions as animat movement commands, The application also extends the Virt-U command set that allows switching between external cameras views and first-person views from the perspective of different animats. In some implementations, the Virt-U Builder can have one or more user customizable features, which can include:

a custom set of VE assets that determine how each individual object looks to the observer and allows for positioning of these objects in the scene;

different pre-created animats placed at specific locations in the VE scene; and placement of virtual cameras characterized by a custom set of parameters to achieve a third-person view of certain portions of the scene.

Running Virt-U Application in the No-Brainer Mode

In some implementations, the physics engine runs VE applications on its internal clock that synchronizes physical interactions with 3D graphic rendering. Users can control execution of the Virt-U application in no-brainer mode via the GUI described in Table 1.1 below. In other implementations Virt-U library exposes all the necessary API to an external application and provides it with all the necessary functionality to establish a similar GUI bypassing Virt-U application.

Virt-U Implementation

Figure 18:
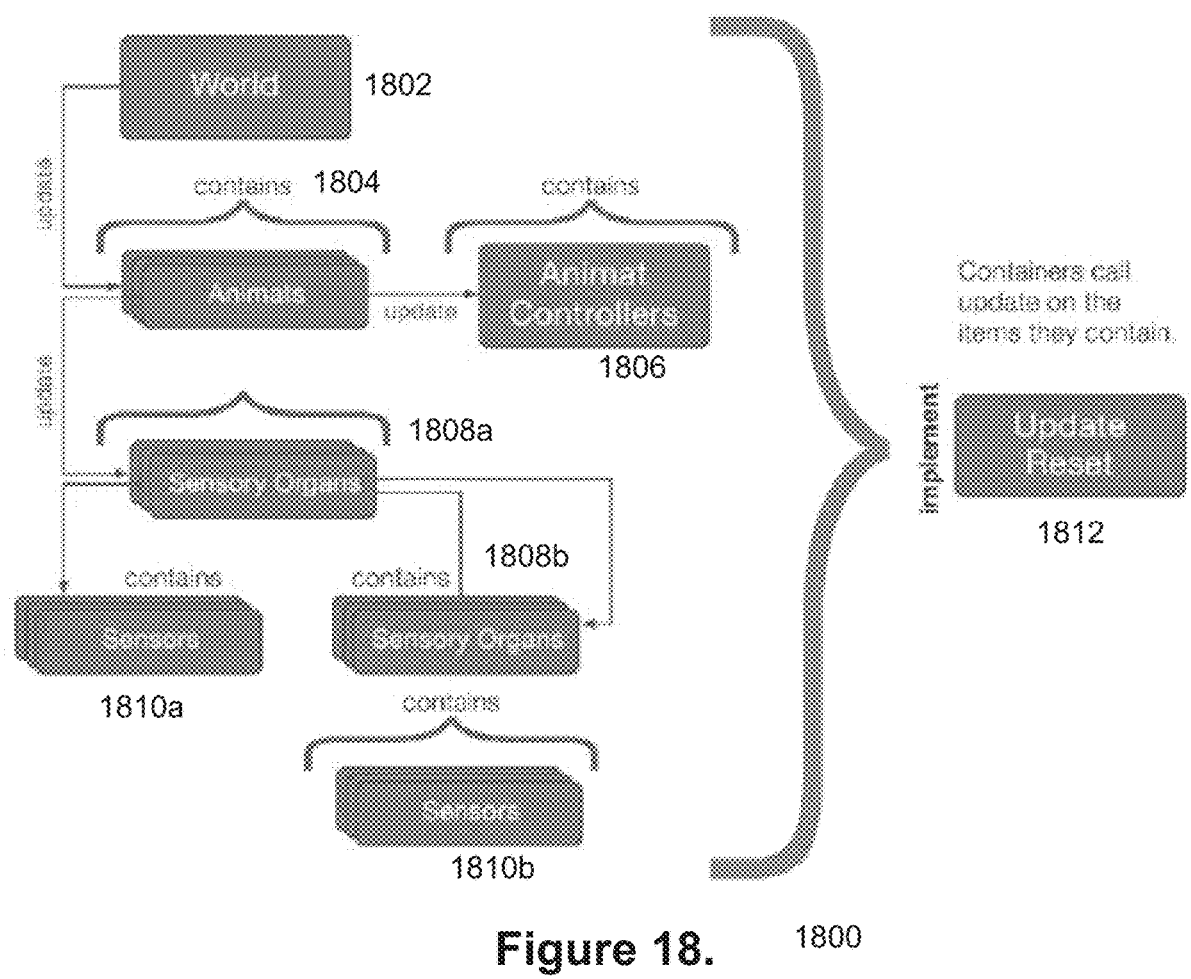
FIG. 18 provides an example structure of Virt-U classes.

Implementation of Virt-U may comprise Java classes (e.g., see FIG. 18) and interfaces that are extended or implemented to abstract the functionality to supply sensory information to the neural model as well as perform a behavior based on exposed motor control interfaces. The following sections discuss example Virt-U classes.

VirtUApplication Class

The VirtUApplication class 1800 is a focal point of communication between the game engine and Virt-U. The class implements JMonkey's SystemListener interface and thus provides an entry point for handling GUI events, rendering graphics, updating sensory information, and/or exercising controlled behavior. The VirtUApplication class initializes components of the JMonkey game engine, creates a rendering context, and instantiates the world. When JMonkey Engine calls the update method of the SystemListener interface in the VirtUApplication class, the latter may call the update method on the World class. In turn, the World class may call the update method on all objects populating the world.

VirtUApplication is extended by the DebugApplication class that is part of Virt-U application and runs Virt-U in no-brainer mode. In simulation mode, the VirtUAplication class may be extended by different application classes that expose the engine in different modes: synchronized to the neural simulation clock or running asynchronously. On the neural simulation proxy level these classes can be further extended or wrapped depending on the neural engine implementation. In one example of the proxy layer the CogVirtUApplication provides an entry point to control execution of Virt-U from Cog Ex Machina package written in Scala. In another implementation VirtUAplication is wrapped in Java Native Interface object to provide an entry point to the engine from INDRA package written in C++. Note that Virt-UApplication is a singleton class and, in described implementations, only one instance of VirtUApplication can exist.

World Class

The World class 1802 serves as the main container for landscape, animats, items, and external cameras. The world appearance is determined by the scene model specified as an argument to the addScene method. The scene is encoded by the model's.j3o file that can be generated by Virt-U application or outside of Virt-U using third party software. In some implementations, by default, Virt-U adds an external chase camera positioned at a predetermined distance close to the animat. World is a singleton class. Animats may be added by the addAnimat method that takes a reference to the constructed animat and coordinates specification of an animat's initial location. External objects may be added to the world by calling addObject with an instance of the item class passed as an argument. External cameras may be added to the world instance by calling addCamera with arguments specifying location, orientation, and frustum of the camera.

The World class instance may be responsible for updating the state of animated and non-animated objects it contains. This may be performed by calling the update method on these objects. Similarly the update method is called on each non-animated objects. The World singleton object also calls the reset method for animated and no-animated objects it contains in a manner similar to that of update.

World class itself exposes the update and reset method called internally by the VirtUApplication object which exhibits SystemListener interface and thus is called by the engine on each step to update world's state and the state of its components.

Animat Class

The Animat class 1804 can serve as the base class for implementation of animats with a desired set of properties. Animat implementation details are described later in this report. In some implementations, another function of the Animat class is to serve as a container for sensory organs and animat control. The Animat class implements the update method from which it calls update for each sensory organ that the animat contains. Sensory organs may be added to the animat during its construction or initialization by calling an addController method that takes OrganController 1806 reference as an argument.

To control animat behavior, a control object may be created. The control object is animat-specific and depends on the type of outgoing interfaces exposed by the ultimate animat class. For example, walking animats such as a virtual animal expose the walking controls, allowing the caller to specify the direction and speed of walking or running. Vehicle animats expose vehicle controls, allowing the caller to specify acceleration and steering. Control objects are added via an addControl method typically called during animat initialization or construction, passing a control object reference as an argument. All elements of an animat's behavioral interface may be accessed via its control object.

In some implementations, another function of the Animat class is to generate and hold a collision shape. The collision shape may be generated in the shape of a capsule surrounding the animat (depending on its dimensions) or as a more tightly fit shape following the animat shape. The collision shape serves as a proximity sensor as well as a chase camera boundary.

Vehicle Classes

The Vehicle class is derived from the animat class to encapsulate functionality related to vehicle control and vehicle composition. The specific vehicle class may be derived from the Vehicle class. The specific vehicle class may determine the appearance and navigational properties of the vehicle, sets up relevant sensory organs and motor controls, and determines its sensitivity to reward values as well as its collision properties. The Vehicle class may receive and interpret a user's input for control of the animat in no-brainer mode. The user's input may allow the user to accelerate/decelerate and steer the vehicle.

Other Animat Classes

The Virt-U may also include the CharacterAnimat and specific character classes that implement a walking character whose motion is based entirely on kinematics. A walking character may be controlled by standard GUI commands that allow the user manipulate the direction of motion (forward/backward, left/right turns, jumping).

OrganController Class

OrganControlier may serve as the base class for all sensory organs. It may define the update and reset methods 1812 that may be implemented by the derived classes. In some implementations, the purpose of classes that extend OrganController is either to supply sensory information specific to an animat's senses 1808a, 1810a or to contain other sensory organs 1808b, 1810b.

OculoMotor Class

This class handles visual inputs from single- or multi-camera sources as well as rotation of the cameras. Multi-camera sources are used here to simulate, with minimal distortion, large (>75 degrees) fields of view (FoV) that are attainable with certain real world cameras. In some embodiments, the multi-camera source works by combining inputs from several narrow FoV cameras (or facets) and deliver the result of this operation as a single input data stream. The OculoMotor class acts as a container for Eye class objects, which in turn contain camera sensor facets.

Vestibular Class

This class may embody vestibular inputs that record self-motion of the agent. The vestibular sensors may provide the model with linear and angular velocities or accelerations of the agent as would be done if the respective accelerations were measured by accelerometers and gyroscopes of the real robotic device. Realistic noise models can be added to further improve the quality of simulated by Vestibular class real IMUs.

Rewards and Collisions

In some implementations, rewards and collisions may be accessed through their respective controllers to obtain reward and collision or touch sense sensory data. The update of touch and reward information may happen due to implementation of the CollisionListener interface by their respective animat classes. Collision may be detected via a collision body: an invisible and weightless shape surrounding the animat that serves as a proximity sensor. Collision or detection of an external object by proximity sensor can result in obtaining a reward value if a reward is attached to an object that the animate collides with or senses via proximity sensor. To sense a reward, the animat should have a corresponding reward sense. Sensing the reward information allows reinforcement learning to be implemented as part of the neural model controlling animat behavior. Lastly, a stationary object that extends the Item class can be associated with different rewards types holding a different reward value.

TouchSense Class

TouchSense abstracts touch/proximity sensors that provide a vector in polar coordinates centered on the agent's center of mass and pointing to the locations of collision (for touch sensor) or close-to-collision (proximity sensor). In some implementations, a difference between touch and proximity is the fitness of the collision surface for the agent. For example, for a touch sensor the collision surface substantially conforms to the shape of the body, whereas a shape surrounding the body with a radius corresponding to the sensor range is created for proximity sensors. In the touch sensor the length of the vector can relate to the strength of an impact, and in the proximity sensor the vector length can relate to the distance between the agent and the edge of an obstacle. In some implementations, multiple collisions can be detected and passed to the model simultaneously.

RewardSense Class

RewardSense abstracts an arbitrary type of reward in order to model positive or negative reinforcement. In the context of Mars exploration, RewardSense sensors can simulate results coming from chemical analysis of samples collected by the Rover. Any object in the VE can be assigned a reward type and value by the VE designer, and if the animat comes in contact with such an object during the simulation it will receive information about the associated reward type and its value.

Other Sensory Organ Classes

In some implementations, the Virt-U system can include additional sensors for testing and verification. These included a GPS-like sensor that provides the true coordinates of an agent at any point in time. Such a sensor could be used to verify and tune precision of the internal path integration system.

AnimatVehicle Class

The AnimatVehicle class provides entry points to control a vehicle that can use the JBullet ray-casting mechanism to mimic suspension of a physical vehicle. This class extends the JMonkey VehicleControl class and implements the CollisionListener interface. The latter constitutes a callback from the JMonkeyEngine that is called to handle collisions. The VehicleAnimat class can act asynchronously compared to the JMonkey game engine clock via the GUI interface, but actions can occur on game engine clock ticks. The update method implemented by the AnimatVehicle Class can execute queued control commands to the vehicle.

The collision method called back by JMonkeyEngine to handle collision events may allow the AnimatVehicle class to populate the touch or proximity sensor map. The touch map can be retrieved upon request from the TouchSense organ, but actual touch map generation can occur within the AnimatVehicle class. The reward may be updated if a collision body other than the animat has a reward type for which the animat subscribes by having an attached reward sense. Reward information (different from collision information) related to the nature, or quality, of the reward can also be filtered for environment.

AnimatCharacter Class

The AnimatCharacter class may provide entry points to control a walking character. The class extends JMonkey's PhysicalCollisionObject class that ultimately implements the CollisionListener interface. Actual movement control and collision handling may be implemented in the aggregated AnimatCharacterControlier object which implements the ActionListener interface. AnimatCharacterController controls movement based on linear and angular velocities, and supports movement along an animat's own forward/backward and left/right axes as well as world up/down axis plus rotations of heading and elevation. Collisions may make the animat slide along the colliding surface by changing heading and/or elevation. AnimatCharacterController may also use the ghost object and convex sweep test to search for upcoming collisions. This may be combined with discrete collision detection to recover from collisions with objects. Lastly, AnimatCharacterController handles collision and reward information similarly to the manner described above for AnimatVehicle objects.

Externally Driven Rendering Context

The physical clock that exists in JMonkey engine operates in units of time that corresponds to the physical world where objects have simulated masses, accelerations, torques, forces, and other physical properties in corresponding units. The graphical clock in the engine is synchronized to the physical clock, yet both clocks are designed to run asynchronously based on user input. In the case when neural simulation speed differs significantly between neural simulator and robotic embodiment this may not be appropriate, and the Virt-U system may synchronize the simulation clock with these two engine clocks so that inputs and outputs between the brain model and the animat's body operate on the same clock simulating the real time interactions. To achieve this synchronization, a custom rendering context was created that is driven by the simulation clock. On every tick of the simulation clock the world advances for a time interval that is equal to the length of the model processing cycle.

Virt-U Proxy Layers for Cog Ex Machina and INDRA Neural Simulators.

Virt-U proxy layer may expose Virt-U library interface to neural simulation software. Depending on the programming language used in the neural simulator, Virt-U proxy layer may be a collection of Java and/or Scala classes (example implementation for Cog Ex Machina) or a collection of C++ classes with internal Java Native Interface wrappers around Virt-U library calls (example implementation for C++ based INDRA neural simulator).

Figure 19:
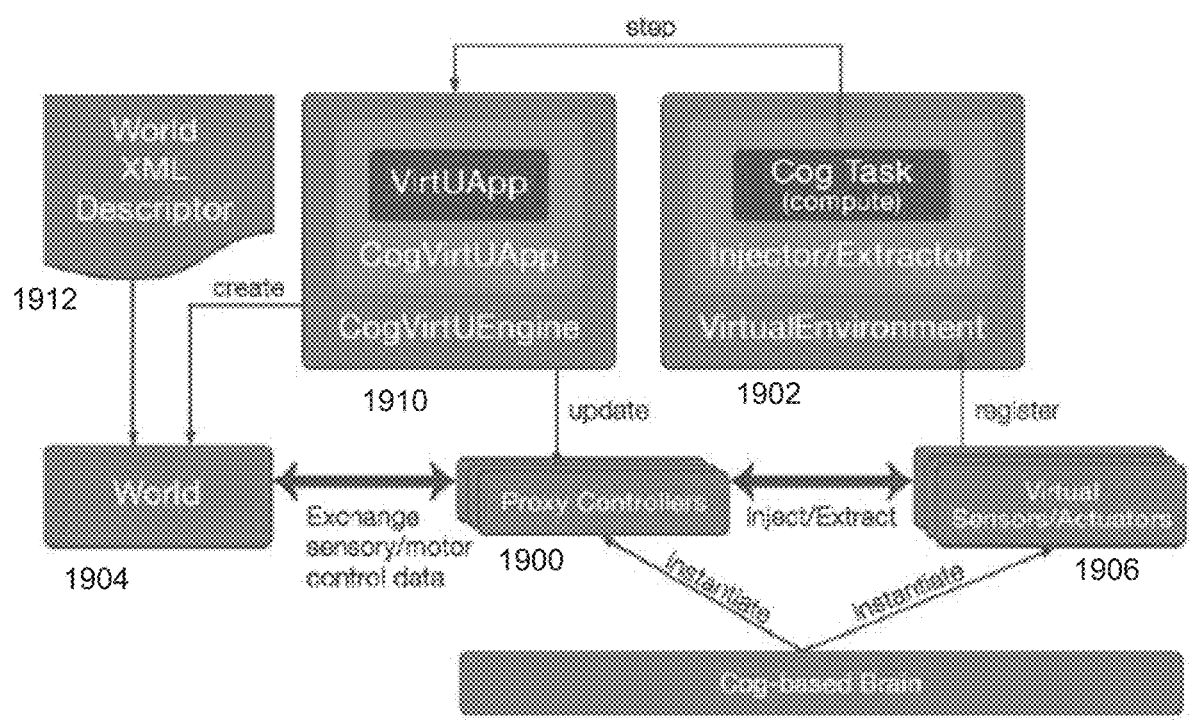
FIG. 19 shows a structure of a proxy layer designed to interface Virt-U with Cog Ex Machina.

In some embodiments, the Virt-U proxy layer for Cog Ex Machina (e.g., see FIG. 19) is designed for dynamic update and extraction of designated sensory (1904 to 1900, to 1906 to 1902) and motor control (1902 to 1910 to 1904) dynamic fields in the neural model (1908). Cog Ex Machina adopts a synchronous and entirely deterministic model of computation that may define the computational process as a sequence of steps. Updates occur substantially simultaneously after execution of each step—this includes sensory information injection and motor control information extraction.

INDRA based proxy layer adopts an asynchronous model between virtual environment and neural model. This allows a user to test the performance of complicated neural models in real time and simplifies their transition to robotic embodiments. Virt-U proxy layer for INDRA may add time-averaging to the sensory readings for the cases when virtual environment queries sensors more often than the neural model can process the information.

Manipulating Virt-U from Neural Application

The neural application initializes a VE or World 1914 using a path to the XML description 1912 of the virtual world. This may create neural populations 1908 before the virtual world is instantiated and its sensory organs become accessible like in Cog Ex Machina proxy. This may also follow the opposite order and instantiate virtual world 1904 and sensory/motor buffers 1906 before any neural populations are created as in INDRA proxy. In both cases the subsequent construction within the proxy instantiates the missing parts and links them together. In some cases this linkage can be established by providing pointers to the neural data structures to the respective sensory/motor objects of the proxy 1900. In other cases it can be established by providing callbacks 1906 that execute sensory motor operations on the neural populations.

The mechanism by which the outside world connects to the neural model is called injection/extraction. Using injection, data can be placed into a neural population; extraction may allow data to be pulled from the neural population to perform a desired behavior.

Proxy Controllers

The proxy controllers 1900 serve as either input or output controllers between Virt-U proxy layer and Virt-U library. Actual data exchange occurs in the update method. Input controllers may acquire data from Virt-U sensory organs and inject them into virtual sensors. Output controllers may acquire data from virtual actuators and use animat control interfaces to perform the animat's desired behavior.

DebugWorld Example Class

```
public class TestMarsWorld extends DebugWorld implements WorldBuilder
{
  //....
    super( );
    app.setDebugCollisionShap es(true);
}
@Override
public void construct( )
{
World.instance.addScene("Scenes/Mars.j3o");
        Rover animat = new Rover("Rover", "Models/RoverParts/RoverBody.j3o");
        World.instance.addAnimat(animat, new Vector3f(0.0f, 93f, 0f), 2.0f*((float)
Math.PI)/3.0f, 0.0f);
        // add cameras
}
```

GUI commands for the Virt-U Builder application

TABLE I.1

| GUI commands for the Virt-U Builder application | |
|---|---|
| User Action | System response |
| Key H | For animals: Set constant speed to move the active animat to the left. Speed remains constant until a conflicting command is issued.<br>For vehicles: Apply steering to the left. Steering is only applied while the key is pressed. |
| Key K | For animals: Set constant speed to move the active animat to the right. Speed remains constant until a conflicting command is issued.<br>For vehicles: Apply steering to the right. Steering is only applied while the key is pressed. |
| Key U | For animals: Set constant speed to move the active animat forward. Speed remains constant until a conflicting command is issued.<br>For vehicles: Apply forward acceleration. Releasing the key leaves the speed constant (pending terrain slopes and obstacles). |
| Key J | For animals: Set constant speed to move the active animat backward. Speed remains constant until a conflicting command is issued.<br>For vehicles: Apply brakes. Releasing the key releases the brake. |
| Key G | For animals: Set constant speed to move the active animat upwards. Speed remains constant until a conflicting command is issued.<br>For vehicles: No effect. |
| Key B | For animals: Set constant speed to move the active animat downwards. Speed remains constant until a conflicting command is issued.<br>For vehicles: No effect. |
| Spacebar Key | For animals: Set all speeds to zero.<br>For vehicles: Jump in the air. |
| Key comma (,) | For animals: Set constant angular velocity of the active animat rotating it to the left. Velocity remains constant until a conflicting command is issued.<br>For vehicle: No effect. |

TABLE I.1-continued

GUI commands for the Virt-U Builder application

| User Action | System response |
|---|---|
| Key period (.) | For animals: Set constant angular velocity of the active animat rotating it to the left. Velocity remains constant until a conflicting command is issued. For vehicle: No effect. |
| Key F | For animals: Set constant angular velocity of the active animat rotating its front upward. Velocity remains constant until a conflicting command is issued. For vehicle: No effect. |
| Key V | For animals: Set constant angular velocity of the active animat rotating its front downward. Velocity remains constant until a conflicting command is issued. For vehicle: no effect. |
| Key E | Switch to first person view from the eye of the active animat. |
| Key [ | Each press cycles through available eyes of the active animat, making the next eye the source of the first person view. |
| Keys 0-9 | Switch the active external camera-to-camera. Camera 0 is a follow camera that always has the first animat in focus. Cameras 1-9 are optional cameras that are fixed in space. If the world has less than 9 fixed cameras the extra keys have no effect. |
| Mouse move | No effect if the camera 0 or first person view is active. Rotate the active camera if camera 1-9 is active. |
| Mouse button press + mouse move | If camera 0 is active, rotate the camera view. |
| Mouse wheel | Zoom-in/zoom-out with the camera. |
| Key C | Outputs the current position and direction of the active camera. This is useful for precise camera positioning. |
| Keys W, S, A, D | Move cameras 1-9 forward, backward, left, and right, respectively. |
| Keys Q, Z | Move cameras 1-9 upward and downward, respectively |
| Keys F1-F10 | Set the active animat to animat 1-10. If there are fewer than 10 animats the extra keys have no effect. |
| Key TAB | Saves the current world configuration to an XML file. |
| Key P | Pauses and unpauses the rendering. |
| Escape Key | Exits the application. |
| Key M | Outputs memory usage of the application to the standard output. |

List of Virt-U sensors-actuators
VirtualSensor
VirtualVectorSensor
VirtualColorSensor
VirtualRetina
VirtualColorRetina
VirtualScalarFieldActuator
Virtual0DSensor
Virtual0DScalarFieldActuator
Proxy Controllers Implemented to Support Simulation During Phase I
StaticCameraIC—injects color images from static cameras
EyesIC—injects color input images from virtual vision sensory organs;
VestibularIC—injects vestibular data in three 0D scalar fields;
RewardsIC—injects reward values into an array of 0D sensors;
TouchIC—injects touch information into a 2D scalar field representing a touch map in polar coordinates;
VehicleLinearSpeedIC—injects vehicle linear velocity into a 0D scalar field;
VehicleAngularVelocityIC—injects vehicle angular velocity into a 0D scalar field;
GlobalPositionIC—injects GPS data into a 0D vector field;
EyesOC—extracts eye movement information from the actuator field; and
DualMotorOC—enforces vehicle angular and linear velocity based on values extracted from two 0D dynamic scalar fields.

Example of Cog Virt-U Application (Animat Wandering a Virtual World)

```
object Wandering extends CogBrowserApp("Wandering around", SimConfig.rate)
{
  val engine = new CogVirtUEngine("assets/Worlds/TestWorld", setupControllers)
  //The rest of the object is your network
  //create sensor and actuator fields
  val otolithX = new Virtual0DSensor("otolith X")
  val otolithZ = new Virtual0DSensor("otolith Z")
  val sscanal = new Virtual0DSensor("sscanal")
  val gps = new VirtualVectorSensor(3,"GPS")
  val somatoSensorSize = 100
  val touch = new VirtualSensor(somatoSensorSize, somatoSensorSize,"touch")
```

```
  val rewards = new Virtual0DSensor("comfort")
  val staticCameras = new StaticCameraFields
  val lv = new PresetLVField("LinearVelocity", 0.4f)
  val av = new PresetAVField("AngularVelocity", 30)
  val rmmcf = new RandomMicroMacroSaccadesField("EyeRotation", .01f*SimConfig.rate,
  .01f*SimConfig.rate, 30)
   val eye = new FovealField("Rat","Right Eye")
   //brain model .........
   //callback to initialize sensor/actuator controllers
   def setupControllers {
      val world = World.instance//engine.getWorld
      engine.registerController(new StaticCameraIC( world.cameras( ),staticCameras))
      val animat = world.animats( ).get(0)
      engine.registerController(new EyesIC(animat,eye))
      engine.registerController(new VestibularIC(animat,otolithX,otolithZ,sscanal))
      engine.registerController(new GlobalPositionIC(animat,gps))
      engine.registerController(new RewardsIC(animat,rewards))
      engine.registerController(new TouchIC(animat,touch))
      engine.registerController(new EyesOC(animat,rmmcf.saccadeField))
      engine.registerController(new
  DualMotorOC(animat.asInstanceOf[CharacterAnimat],av.avField,lv.lvField, false))
   }
 }
```

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for training a neural network in a virtual environment before deploying the neural network on a first platform, the system comprising:
   a virtual engine to simulate sensory information using a simulated platform;
   a proxy engine to:
      transmit the simulated sensory information to the neural network;
      extract neural information from the neural network based on the simulated sensory information; and
      transmit control information to the simulated platform based on the extracted neural information; and
   an Application Programming Interface, communicatively coupled to the virtual engine and the proxy engine, to enable communication between the neural network and the simulated platform, wherein the virtual engine and the proxy engine system are configured to test the simulated platform.

2. The system of claim 1, wherein the Application Programming Interface is further configured to deploy the neural network to the first platform.

3. The system of claim 2, wherein the first platform is a robotic platform.

4. The system of claim 1, wherein the simulated platform includes at least one animat controlled by the neural network model.

5. The system of claim 4, wherein the at least one animat includes a plurality of simulated sensory organs and a plurality of animat controls.

6. The system of claim 1, further comprising:
a graphical user interface configured to enable a user to the control the system.

7. The system of claim 6, wherein the graphical user interface is further configured to enable a user to create at least one animat controlled by the neural network model.

8. A system for training a neural network in a virtual environment before deploying the neural network on a first platform, the system comprising:
a virtual engine to simulate sensory information using a simulated platform;
a proxy engine to:
transmit the simulated sensory information to the neural network;
extract neural information from the neural network based on the simulated sensory information; and
transmit control information to the simulated platform based on the extracted neural information;
an Application Programming Interface, communicatively coupled to the virtual engine and the proxy engine, to enable communication between the neural network and the simulated platform; and
a simulation engine to generate the simulated platform.

9. A method for training a neural network in a virtual environment before deploying the neural network on a first platform, the method comprising:
simulating, via a virtual engine, sensory information using a simulated platform;
transmitting, via a proxy engine, the simulated sensory information to the neural network;
extracting, via the proxy engine, neural information from the neural network based on the simulated sensory information;
transmitting, via the proxy engine, control information to the simulated platform based on the extracted neural information; and
testing, via the virtual engine and the proxy engine, the simulated platform.

10. The method of claim 9, further comprising:
deploying, via an Application Programming Interface, the neural network to the first platform.

11. The method of claim 10, wherein the first platform is a robotic platform.

12. The method of claim 9, further comprising:
controlling, via the neural network, at least one animat included in the simulated platform.

13. The method of claim 12, wherein the at least one animat includes a plurality of simulated sensory organs and a plurality of animat controls.

14. A method for training a neural network in a virtual environment before deploying the neural network on a first platform, the method comprising:
generating, via a simulation engine, a simulated platform;
simulating, via a virtual engine, sensory information using the simulated platform;
transmitting, via a proxy engine, the simulated sensory information to the neural network;
extracting, via the proxy engine, neural information from the neural network based on the simulated sensory information; and
transmitting, via the proxy engine, control information to the simulated platform based on the extracted neural information.

15. The method of claim 14, further comprising:
deploying, via an Application Programming Interface, the neural network to the first platform.

16. The method of claim 15, wherein the first platform is a robotic platform.

17. The method of claim 14, further comprising:
controlling, via the neural network, at least one animat included in the simulated platform.

18. The method of claim 17, wherein the at least one animat includes a plurality of simulated sensory organs and a plurality of animat controls.

19. The system of claim 8, wherein the Application Programming Interface is further configured to deploy the neural network to the first platform.

20. The system of claim 19, wherein the first platform is a robotic platform.

21. The system of claim 8, wherein the simulated platform includes at least one animat controlled by the neural network model.

22. The system of claim 21, wherein the at least one animat includes a plurality of simulated sensory organs and a plurality of animat controls.

23. The system of claim 8, further comprising:
a graphical user interface configured to enable a user to the control the system.

24. The system of claim 23, wherein the graphical user interface is further configured to enable a user to create at least one animat controlled by the neural network model.

* * * * *